US007181417B1

(12) United States Patent
Langseth et al.

(10) Patent No.: US 7,181,417 B1
(45) Date of Patent: Feb. 20, 2007

(54) SYSTEM AND METHOD FOR REVENUE GENERATION IN AN AUTOMATIC, REAL-TIME DELIVERY OF PERSONALIZED INFORMATIONAL AND TRANSACTIONAL DATA

(75) Inventors: Justin Langseth, Reston, VA (US); Nicolas J. Orolin, McLean, VA (US); Ajay Talwar, McLean, VA (US); Phillippa J. Fishman, Fairfax, VA (US)

(73) Assignee: MicroStrategy, Inc., McLean, VA (US)

( * ) Notice: Subject to any disclaimer, the term of this patent is extended or adjusted under 35 U.S.C. 154(b) by 913 days.

(21) Appl. No.: 09/488,924

(22) Filed: Jan. 21, 2000

(51) Int. Cl.
*G06Q 17/6065* (2006.01)

(52) U.S. Cl. ...................................................... 705/26
(58) Field of Classification Search ................ 709/318; 705/26
See application file for complete search history.

(56) References Cited

U.S. PATENT DOCUMENTS

| 4,207,598 | A | 6/1980 | Reich et al. |
|---|---|---|---|
| 4,598,367 | A | 7/1986 | DeFrancesco et al. |
| 4,812,843 | A | 3/1989 | Champion, III et al. |
| 4,868,561 | A | 9/1989 | Davis |
| 5,192,999 | A | 3/1993 | Graczzyk et al. |
| 5,216,517 | A | 6/1993 | Kinoshita et al. |
| 5,281,962 | A | 1/1994 | Vanden Heuvel et al. |
| 5,307,059 | A | 4/1994 | Connary et al. |
| 5,317,628 | A | 5/1994 | Misholi et al. |
| 5,444,433 | A | 8/1995 | Gropper |
| 5,493,692 | A | 2/1996 | Theimer et al. |
| 5,513,126 | A | 4/1996 | Harkins et al. |
| 5,530,438 | A | 6/1996 | Bickham et al. |
| 5,586,173 | A | 12/1996 | Misholi et al. |
| 5,663,717 | A | 9/1997 | DeLuca |
| 5,664,009 | A | 9/1997 | Hurst et al. |
| 5,675,721 | A | 10/1997 | Freedman et al. |
| 5,717,744 | A | 2/1998 | Yoshida et al. |
| 5,721,827 | A | 2/1998 | Logan et al. |
| 5,734,589 | A | 3/1998 | Kostreski et al. |
| 5,793,972 | A | 8/1998 | Shane |
| 5,819,284 | A | 10/1998 | Farber et al. |
| 5,845,073 | A | 12/1998 | Carlin et al. |
| 5,848,396 | A | 12/1998 | Gerace |
| 5,850,433 | A | 12/1998 | Rondeau |

(Continued)

FOREIGN PATENT DOCUMENTS

JP 2000174893 A * 6/2000

OTHER PUBLICATIONS

Dictionary.com; Definition of subscription; American Heritage Dictionary of the English Language, Fourth Edition, 2000, Houghton Mifflin Company.*

(Continued)

*Primary Examiner*—Elaine Gort
(74) *Attorney, Agent, or Firm*—Hunton & Williams LLP

(57) ABSTRACT

A system and method for generating revenue from a personalized intelligence network which outputs personalized and timely informational and transactional content from an OLAP-based system to individuals through use of a high-speed processing and output delivery system to email, Excel, pager, mobile phone, fax, telephone, personal digital assistants and other output devices. Affiliates may enlist subscribers and receive a share of revenues generated from subscription fees, advertising fees, bundling fees and transaction fees.

27 Claims, 20 Drawing Sheets

U.S. PATENT DOCUMENTS

| | | | |
|---|---|---|---|
| 5,850,520 | A | 12/1998 | Griebenow et al. |
| 5,875,433 | A | 2/1999 | Francisco et al. |
| 5,878,337 | A | 3/1999 | Joao et al. |
| 5,881,131 | A | 3/1999 | Farris et al. |
| 5,892,447 | A | 4/1999 | Wilkinson |
| 5,895,454 | A * | 4/1999 | Harrington .................. 705/26 |
| 5,933,811 | A | 8/1999 | Angles et al. |
| 5,944,786 | A | 8/1999 | Quinn |
| 5,999,975 | A | 12/1999 | Kittaka et al. |
| 6,006,251 | A | 12/1999 | Toyouchi et al. |
| 6,009,153 | A | 12/1999 | Houghton et al. |
| 6,009,410 | A | 12/1999 | LeMole et al. |
| 6,014,638 | A | 1/2000 | Burge et al. |
| 6,018,569 | A | 1/2000 | Kuwabara et al. |
| 6,029,146 | A | 2/2000 | Hawkins et al. |
| 6,052,710 | A | 4/2000 | Saliba et al. |
| 6,185,198 | B1 | 2/2001 | LaDue |
| 6,363,411 | B1 | 3/2002 | Dugan et al. |
| 6,463,145 | B1 | 10/2002 | O'Neal et al. |

OTHER PUBLICATIONS

Sarawagi et al., "*Discovery-driven Exploration of OLAP Data Cubes,*" 15 pages.

Golfarelli et al., "*Conceptual Design of Data Warehouses from E/R Schemes,*" published in the Proceedings of the Hawaii International Conference On System Sciences, Jan. 6-9, 1998, Kona, Hawal, 10 pages.

Yan et al., "*Toolkits for a Distributed, Agent-based Web Commerce System,*" published in the Proceedings of the International IFIP Working Conference on Trends in Distributed Systems for Electronic Commerce (TrEC '98), Hamburg, Germany, Jun. 3-5, 1998, pp. 1-12.

"System and Method for Automated, Real Time Delivery of Personalized Informational and Transactional Data to Users Via Content Delivery Device," U.S. Appl. No. 09/488,919.

"System and Method for Revenue Generation in an Automatic, Real Time Delivery of Personalized Informational and Transactional Data," U.S. Appl. No. 09/488,924.

"System and Method for a Subject-Based Channel Distribution of Automatic, Real Time Delivery of Personalized Informational and Transactional Data," U.S. Appl. No. 09/488,920.

"System and Method for Automatic, Real-Time Delivery of Personalized Newspaper," U.S. Appl. No. 09/488,922.

"System and Method for Automatic, Real-Time Delivery of Personalized Informational and Transactional Data to Users Via High Throughput Content Delivery Device," U.S. Appl. No. 09/488,923.

"System and Method for Monitoring the Automatic, Real-Time Delivery of Personalized Informational and Transactional Data to Users Via Content Delivery Device," U.S. Appl. No. 09/488,921.

"System and Method for Information Warehousing Supporting Automatic, Real-Time Delivery of Personalized, Informational and Transactional Data to Users Via Content Delivery Device," U.S. Appl. No. 09/488,565.

"System and Method for Automatic, Real-Time Delivery of Personalized Informational and Transactional Data to Users Via E-Mail Delivery," U.S. Appl. No. 09/488,566; and.

"System and Method for Automatic, Real-Time Delivery of Personalized Informational and Transactional Data Including Graphical Object to Users Via Content Delivery Device," U.S. Appl. No. 09/488,567, each filed Jan. 21, 2000.

\* cited by examiner

"Good afternoon Mark. Here is your daily stock market summary. The Dow Jones Average was us 13.38 points to close at 8519.23. The Nasdaq composite was up 35.56 points to close at 1674.75. Your portfolio was up $73.25. Please check your e-mail for your personal portfolio summary." — 400

Figure 12

To: Yan Durling  
Fax: 1-555-555-2323  
Date: Feb. 28, 2000  
Time: 17:52

Daily Market Summary

| Stock | Close | Change | High | Low | Vol | PCT |
|-------|-------|--------|------|-----|------|---------|
| XYZ | 52 7/8 | -1 1/8 | 61 | 50 | 400K | -2.12% |
| ABC | 96 | +15 | 120 | 95 | 1.4M | +18.52% |
| LRV | 14 1/4 | + 1/4 | 14 1/2 | 14 | 20K | +1.79% |
| NOW | 36 1/8 | -1/8 | 38 1/8 | 36 | 200K | 0.34% |

SYSTEM AND METHOD FOR REVENUE GENERATION IN AN AUTOMATIC, REAL-TIME DELIVERY OF PERSONALIZED INFORMATIONAL AND TRANSACTIONAL DATA

FIELD OF THE INVENTION

This invention relates to a system and method for generating revenue from a personalized intelligence network which outputs personalized and timely informational and transactional content from an OLAP-based system to individuals through use of a high-speed processing and output delivery system to email, Excel, pager, mobile phone, fax, telephone, personal digital assistants and other output devices. Affiliates may enlist subscribers and receive a share of revenues generated from subscription fees, advertising fees, bundling fees and transaction fees.

BACKGROUND OF THE INVENTION

Information is most useful when it is delivered to the right person at the right time. Delivery of the right information to the right person has been a problem that many businesses have attempted to solve over the years. Indeed, an entire industry of decision support technology exists to deliver information to members of a business based on massive amounts of data collected about the businesses. While many such systems exist, most are implemented for delivery of information to businesses and not to individuals. These systems also usually require that a user log-in to the system to seek out information. If information of interest changes rapidly, users must continuously log-on to the system to check for updated information.

Decision support systems have been developed to efficiently retrieve selected information from data warehouses. One type of decision support system is known as an on-line analytical processing system. In general, OLAP systems analyze the data from a number of different perspectives and support complex analyses against large input data sets. There are at least three different types of OLAP architectures—ROLAP, MOLAP, and HOLAP. ROLAP ("Relational On-Line Analytical Processing") systems are systems that use a dynamic server connected to a relational database system. Multidimensional OLAP ("MOLAP") utilizes a proprietary multidimensional database ("MDDB") to provide OLAP analyses. The main premise of this architecture is that data must be stored multi-dimensionally to be viewed multi-dimensionally. A HOLAP ("Hybrid On-Line Analytical Processing") system is a hybrid of these two. Each of these types of OLAP systems are typically client-server systems. The OLAP engine resides on the server side and a module is typically provided at a client-side to enable users to input queries and report requests to the OLAP engine. Many current client-side modules are typically stand alone software modules that are loaded on client-side computer systems. These systems require that a user must learn how to operate the client-side software module in order to initiate queries and generate reports.

An OLAP product developed by MicroStrategy, known as MicroStrategy Broadcaster,™ leverages this decision support technology for automatic delivery of reports based on database contents. MicroStrategy Broadcaster is an OLAP based system that provides businesses and other users with the ability to set up "services" to which participants may subscribe. The service provides content based on data in a database, such as a data warehouse, and may be personalized to users' tastes. For example, while a service may be generated for stock in the warehouse of a company, different sales managers may only want to know the stock for a particular product line. Those sales managers may then personalize the report generated by MicroStrategy Broadcaster™ so that the report only includes information about the product line of interest.

Although some push technologies have been developed for automatically delivering content to users, most systems simply "dump" information about a particular subject without regard to users' particular preferences or interests. Some such technologies are available on the World Wide Web and the Internet.

The World Wide Web and the Internet have provided an avenue for information delivery, but current Web-based systems still fail to adequately deliver the right information at the right time. One of the major problems with the World Wide Web is the requirement to utilize a computer and web-browser to access its contents. Although penetration of computers throughout the world has increased, that penetration is far from making information readily available to everyone wherever they happen to be.

Moreover, most computer users connect to the Web through a land line. Most users therefore do not have access to Web content when they are away from a land line. Although technology is being developed to enable World Wide Web access through other mediums, such as web-enabled personal digital assistants, for example, such technology require users to purchase new equipment to access this technology. Given the sparse penetration of personal digital assistants already, this technology does not satisfy the need for delivery of timely information.

Another system in use today is an interactive telephone system that enables users to interactively request information through a computerized interface. These systems require that the user call in to a central number to access the system and request information by stepping through various options in predefined menu choices. Such information may include accessing account information, movie times, service requests, etc.

A problem with these systems is that the menu structure is typically set and not customized to a particular's users preferences or customized to the information available to that user. Therefore, a user may have to wade through a host of inapplicable options to get to the one or two options applicable to that user. Further, a user may be interested in particular information. With existing telephone call-in systems, that user has to input the same series of options each time they want to hear the results of that report. If the user desires to run that report frequently, the telephone input system described is a very time consuming and wasteful method of accessing that information. Also, if a particular user may only be interested in knowing if a particular value or set of values in the report has changed over a predetermined period of time, in such a system, the user would be required to initiate the report frequently and then scan through the new report to determine if the information has changed over the time period specified.

Further, reports may be extensive and may contain a large amount of information for a user to sort through each time a report is run. Therefore, the user may have to wait a long time for the report to be generated once they input the appropriate parameters for the report.

Therefore, existing systems do not provide a readily available medium for delivery of the right information at the right time or a system for delivering that information.

In addition, customer loyalty has been growing more and more scarce as new business models, such as e-commerce applications, open up new avenues of competition. Companies of all types are in need of products or services to maintain existing customers and attract new customers. Indeed, one of the great challenges faces by Internet-based companies has been providing content and functionality that keeps users coming back. Although many functions and different content is available, there is an almost continuous need for new and meaningful content for users.

These and other drawbacks exist with current systems.

SUMMARY OF THE INVENTION

This invention provides a system and method for providing personal intelligence content that may be provided to affiliates, thereby enabling affiliates to provide useful, meaningful content to its users and/or subscribers with little or no effort in creating, maintaining, charging or dealing with other administrative issues. Specifically, the present invention provides a personalized network that actively broadcasts highly personalized and timely information to individuals via email, spreadsheet programs (over e-mail), pager, telephone, mobile phone, fax, personal digital assistant, HTML e-mail and other formats to generate revenues from subscription fees, transactional fees and advertising fees. Revenue generated may be shared between system participants including the personal intelligence network and affiliates.

In this system, informational and transactional data may be loaded and formatted into a database system. The database system may then provide a plurality of "channels" wherein each channel may comprise information and transactional data about a particular field of interest, such as business, weather, sports, news, investments, traffic and others. Subscribers may then sign up to receive output from one or more services from one or more of the channels of information. A service should be understood to be formatted content that is sent to certain subscribers at a certain frequency or based on the occurrence of a predetermined event, such as an update to a database. For example, a service for an investments channel may be called "Market Update" that sends an email to subscribers every day at 5 p.m. with a summary of the market results for the day. That same service may be scheduled to run periodically throughout the day when new market information is loaded into the investor channel database. These are only two examples of the many types of services that may be processed by the system of the present invention.

A subscriber is any individual or entity that signs up to receive a service and then begins receiving that service on a given schedule that may be set by the subscriber or the system. A schedule is the frequency for which a service is sent to be processed (e.g., end-of-day (after 5 p.m.), intraday (every hour between 10 a.m. and 5 p.m.), end-of-week (5 p.m. on Friday)). A style refers to the kind of look a service has (e.g., a different style exists for a pager versus an email output due to the device constraints). Each subscriber may also select to personalize the service content. Personalization may include preferences for types of content, information, etc. that the user desires to receive within the scope of a particular service. For example, for a service that sends an end-of-market report, the user may only want to see the portions of the report that deal with stocks in her individual portfolio. The service output may also include non-personalized content such as in the previous example, the Dow Jones Average for the day.

Affiliates may simply create opportunities for its users and subscribers or individuals that contact the affiliate to become subscribers of a personalized intelligence network of the present invention that is maintained and created by another entity. For example, as discussed below, an affiliate may be a financial institution that enables its customers to subscribe to an investment and/or personal finance channel that outputs personalized content related to that user's finances with that financial institution and also to present other opportunities to enable the financial institution to leverage its relationship with the user. In another example, communications entities may provide subscriptions to one or more channels to increase the use of an output device that they provide. More specifically, a pager company may enable its users to subscribe to a weather channel that sends alerts over the pager so that its users get increased value from the device. An Internet entity may enable its users to subscribe to provide channel output related to the content from the site. For example, an Internet site related to sports may enable its users to subscribe to a sports output channel.

Accordingly, an entity may become an affiliate of a personalized intelligence network system as described in detail below that generates personalized content to the subscribers through the affiliate. Affiliates may enable their subscribers to subscribe to channel database services to provide personalized intelligence network access.

According to the present invention, one or more channels of personalized intelligence information are accessed and distributed to subscribers to one or more services provided for each channel. Subscribers may sign up to receive one or more services for each of the one or more channels through a web interface system that identifies each of the available types of information that the user may access. The subscription interface may also be a mobile phone, a land-line phone, or any other method of subscribing. The subscriber may input personalization options through the web interface so that the service output generated for that subscriber is what the user desires to get. The subscriber information may be stored in a subscription database that are periodically provided to the channel databases. The subscription information for each subscriber to a service handled by a channel database may be stored for the service for later processing and generation of service output by the system.

The channel databases are populated with information and other data content through one or more data load systems. The data load systems may receive information through continuous feed systems, such as satellite and land line feeds, or through periodic feed systems, such as an FTP data feed system. The data load system cleanses and categorizes the data and then stores the data in the appropriate channel database for later processing.

Further, a data distribution system is provided that processes services using the information in the channel databases. The data distribution system may comprise a data distribution control system and one or more data distribution servers. The data distribution control system controls the operations of a plurality of data distribution servers to balance the load and generate greater output in an efficient manner. Each data distribution server system may comprise a server control system and a plurality of message generator systems (each of which passes generated messages to a mail formatting system and mail forwarding system). The server control system further breaks down the jobs assigned for each of the plurality of message generator systems. That way, a multiple-tiered processing system is provided to distribute the processing load throughout the system.

A nerve center is provided to control the overall operation of the system. Specifically, the nerve center tracks updates to the channel database and the data load system and controls operation of the data distribution system. The nerve center monitors services to determine whether the data necessary is available in the channel database before the service is processed in that database. Before any service is processed by a data distribution system, the nerve center is notified and grants approval. The nerve center is also responsible for monitoring for system performance to avoid errors and faults and has the capability to redirect work within the system to overcome errors or faults with any particular component of the system.

As an example of the present system, a finance channel may be provided that has information about Investments. A separate channel database may be established that contains information for the Finance channel. Within the Finance channel, a plurality of different services may be created, such as Market Update, Stock Portfolio Update, Low P/E in Sector, Biggest Gainers, Biggest Losers, etc. When the service is set up, the predetermined condition for when a service is to be processed may be specified. For this service, the schedule may be hourly (or shorter as the user may specify—even every minute or less if the subscriber were so inclined). Subscribers to the Finance channel may then sign up to receive information from the Finance channel and specifically, may sign up to receive one or more of the services. For each service, the subscribe may also personalize the service, such as requesting a Stock Portfolio Update only for that subscriber's individual stocks or signing up for Biggest Gainers only for a particular industry sector. Also, the subscriber may only want to receive updates every three hours instead of hourly.

Alert services for the finance channel may also be provided. In this embodiment, a subscriber may select to be notified immediately after his stock portfolio experiences a predetermined amount of change, such as 10%, for example.

The services, predetermined processing conditions, and subscribers thereto are then also stored in the Finance channel database. Once a service has been added to a channel database, the nerve center is informed to monitor to make sure that the service is executed. The nerve center may either assign a service to a specific data distribution system for that data distribution system to process every time or may place the service in a scheduling queue to be assigned to a data distribution system when predetermined condition for processing occurs.

When that occurs, the nerve center first checks to ensure that the data to be used for that service has been loaded into the channel database. For example, if the service is a Market Update, the nerve center checks the Finance channel to make sure that the end-of-the-day market information has been loaded into the Finance channel before beginning to process the service. If not, the service may be delayed until the data is available. When the data becomes available, the nerve center then tasks the data distribution system with processing a particular service.

The data distribution system may then process a service in several ways. A service may comprise a collection of subservices, one or more of which are to be processed prior to one or more others. In such event, each of a plurality of different data distribution servers processes a separate subservice. Each sub-service may be further broken down into jobs for each of the message generators managed be a server control system within the data distribution server.

If a service relates to only a single task, then the service may be assigned to a data distribution system. The data distribution control system may break the service into a plurality of jobs assigned to a plurality of different data distribution servers. A server control system for the data distribution server may further break each of the jobs assigned into a plurality of batches, each batch being handled by one of a plurality of message generators. The message generators process each item within a batch and generate the appropriate messages to be output through a message mail formatting system and mail forwarding system to subscribers.

Additionally, to increase throughput, non-personalized content from a service may be processed separately, rather than processing that for each of a plurality of subscribers. The non-personalized content may then be provided to the message generator to include in the messages for each personalized output for the subscribers.

These techniques enable a high throughput output system for processing a plurality of outputs to a large number of subscribers. Other objects and advantages exist for the present invention.

BRIEF DESCRIPTION OF THE DRAWINGS

FIG. 12 depicts an example output for a telephone system according to an embodiment of the present invention.

DETAILED DESCRIPTION OF THE PREFERRED EMBODIMENTS

To make better decisions, people need the right information at the right time. With the proliferation of new means of communication like alphanumeric pages, alphanumeric phones, fax machines and email, communications with people anywhere at anytime have been enhanced. The system of the present invention uses these communication mediums to enable people to make the right decisions, be delivering the information right into their hands through the use of a plurality of subject-based channel of information to which individuals may subscribe. Within each channel, a subscriber may elect from a plurality of services related to that subject-matter.

With the system of the present invention, a person may define what information he would like delivered, when he would like to have it delivered, where to deliver the information and how often to deliver the information. This system provides a user with the information required to make completely informed decisions faster, easier and cheaper.

As part of this process, a personalized intelligence network (PIN) may be provided as detailed below. As part of that network, affiliates may be used to provide subscribers to the channels provided by the PIN. In addition, affiliates may be part of the overall system. Each affiliate may enable persons to subscribe to one or more channels and one or more services within each channel. In such case, affiliates may select which of a plurality of channels of information to make available through that affiliate. Also, affiliates may be content providers. In such case, an affiliate may provide its own channel of information, as detailed below.

Figure 18:
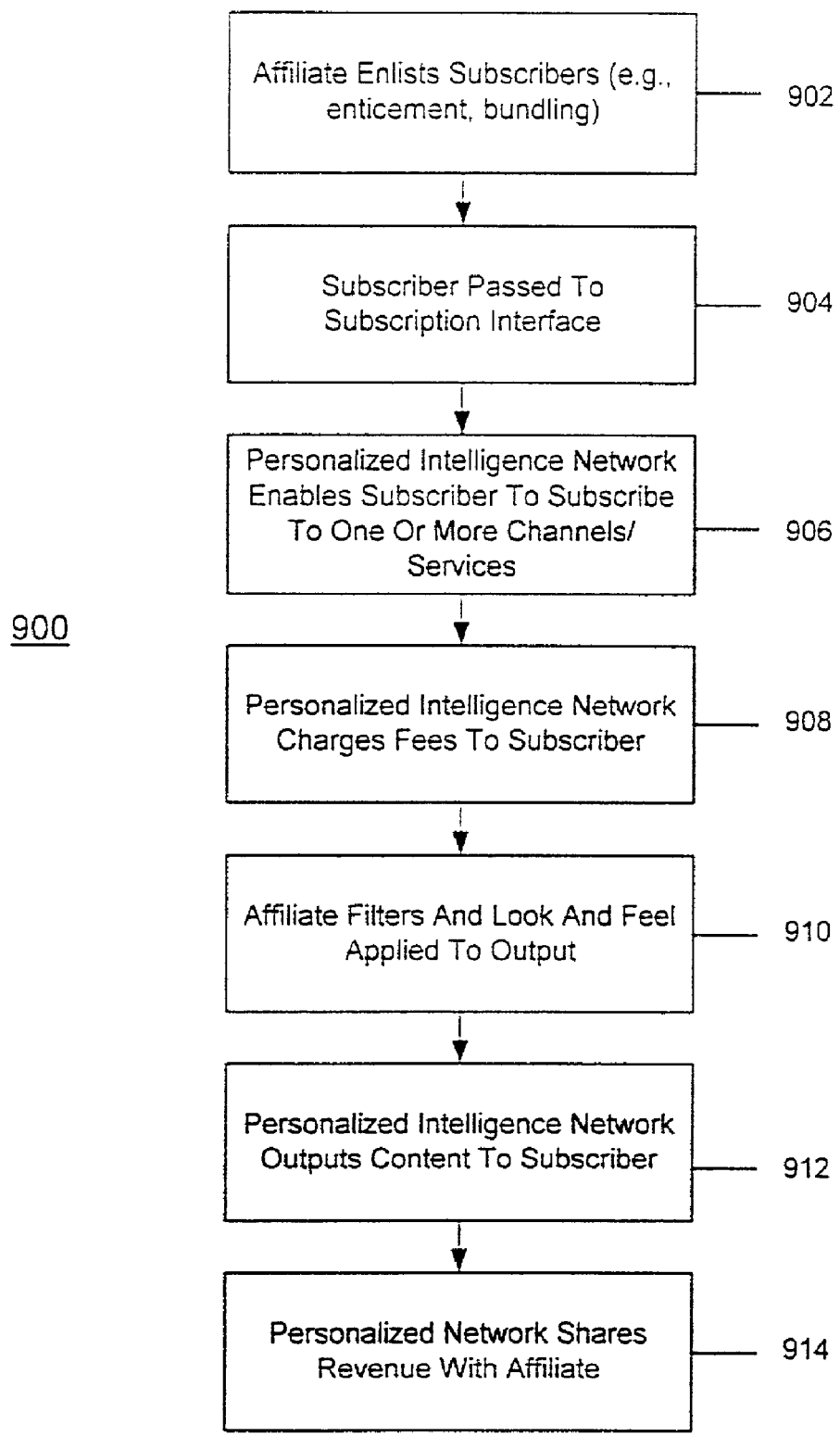
FIG. 18 depicts a flow diagram of a method of affiliate subscriptions to a personalized intelligence network system according to an embodiment of the present invention.

An embodiment of a method practiced between an affiliate and a personalized intelligence network is depicted in FIG. 18. Method 900 involves an affiliate establishing a relationship with a personalized intelligence network and then enlisting subscribers in step 902.

Step 902 may involve the affiliate providing an advertisement for the PIN wherein the subscribers to the network input a code or some other indicator where they learned of the personalized intelligence network. Through use of the code or other indicator, the PIN may then share fees with the affiliate as discussed below in step 914. Step 902 may also involve providing a link to the subscription interface system for the PIN. If the subscription interface for the PIN is an Internet subscription interface, then the affiliate may display a link to the subscription interface web site. The link may be tracked for later attribution to the affiliate. Also, the subscription interface may be hosted on the server for the affiliate system. Also, the affiliate web site may provide the pages from the subscription interface within the look and feel of the affiliate web site so that the user believes that the subscription is being done directly with the affiliate rather than through another entity. Also, step 902 may be performed through bundling a service or product provided by the affiliate with a subscription. For example, a pager entity may sell a pager service with a weather alert service as an additional option as a package. Other methods and steps for enabling the affiliate to enlist a subscriber may be used. Ideally, the subscription through the affiliate may be tracked for fee sharing as described below.

Next, in step 904, the subscription information is recorded by the subscription interface of the PIN. From this point on, the PIN may perform all handling of the subscription. In this way, the affiliate is provided with content for its customers/users with only requiring the enlistment step of step 902.

After the user is passed to the subscription interface, in step 906, the PIN enables the subscriber to subscribe to one or more channels and to one or services for each of the one or more channels. The channels to which the subscriber may enlist may be related to the affiliate in some manner. For example, a sports web site may only desire to have subscribers that subscribe to the PIN through that site be able to sign up for a sports channel. Additionally, as described below, an affiliate may have its own channel that is only available to users that subscribe through that affiliate. Affiliates may also be able to specify which services are available from each channel for its subscribers.

Next, step 908 may be performed. In step 908, subscribers may be charged a fee for subscribing to PIN services. A plurality of subscription charging methods may be employed in step 908 including a fee per service, a fee per channel, an annual fee, a monthly fee, a fee per alert, multi-tiered billing etc. Different fees may be charged depending on the output device to which the user desires output. For example, fees for wired devices such as telephones may be greater than to a wireless device. Also, if monthly fees are charged, the fees may be pro rated depending on when the user subscribes or terminates a subscription in the monthly billing cycle for the service. Many billing methodologies exist for services today and any such methodologies may be used with the present invention. As described below, the subscription interface may comprise a subscription transaction processing module that performs initial charging and periodic billing as well.

Once subscriptions have been established and the subscribers have paid fees (if any), then in step 912, the PIN outputs content to the subscriber from the services that the subscriber requested. Service processing is detailed below. Then in step 914, the PIN may share revenues with affiliates.

Step 914 may comprise a number of revenue sharing methods. Specifically, the affiliate may have earned revenue through bundling or another process in the enlistment step 902. Also, in step 910, the PIN may have earned revenues from fees for subscriptions. These revenues may be shared in order to give both participants incentives to provide this system. For example, an affiliate may receive a percentage of revenues, profits, etc. generated from subscriptions through that affiliate. Alternatively, the affiliate may receive a flat fee per subscription (e.g., a one time fee, a monthly fee or a per transaction fee).

An affiliate may also desire to have some input as to the output that is generated to the subscribers to the PIN through that affiliate. As discussed below, the channel databases provided by the PIN may include local, national and international data to enable users to receive a wide variety of information and data. According to an embodiment of the present invention, the PIN system enables affiliates to include affiliate-specific information in the outputs generated from the system and/or limit the information available to subscribers from that affiliate.

Figure 19:
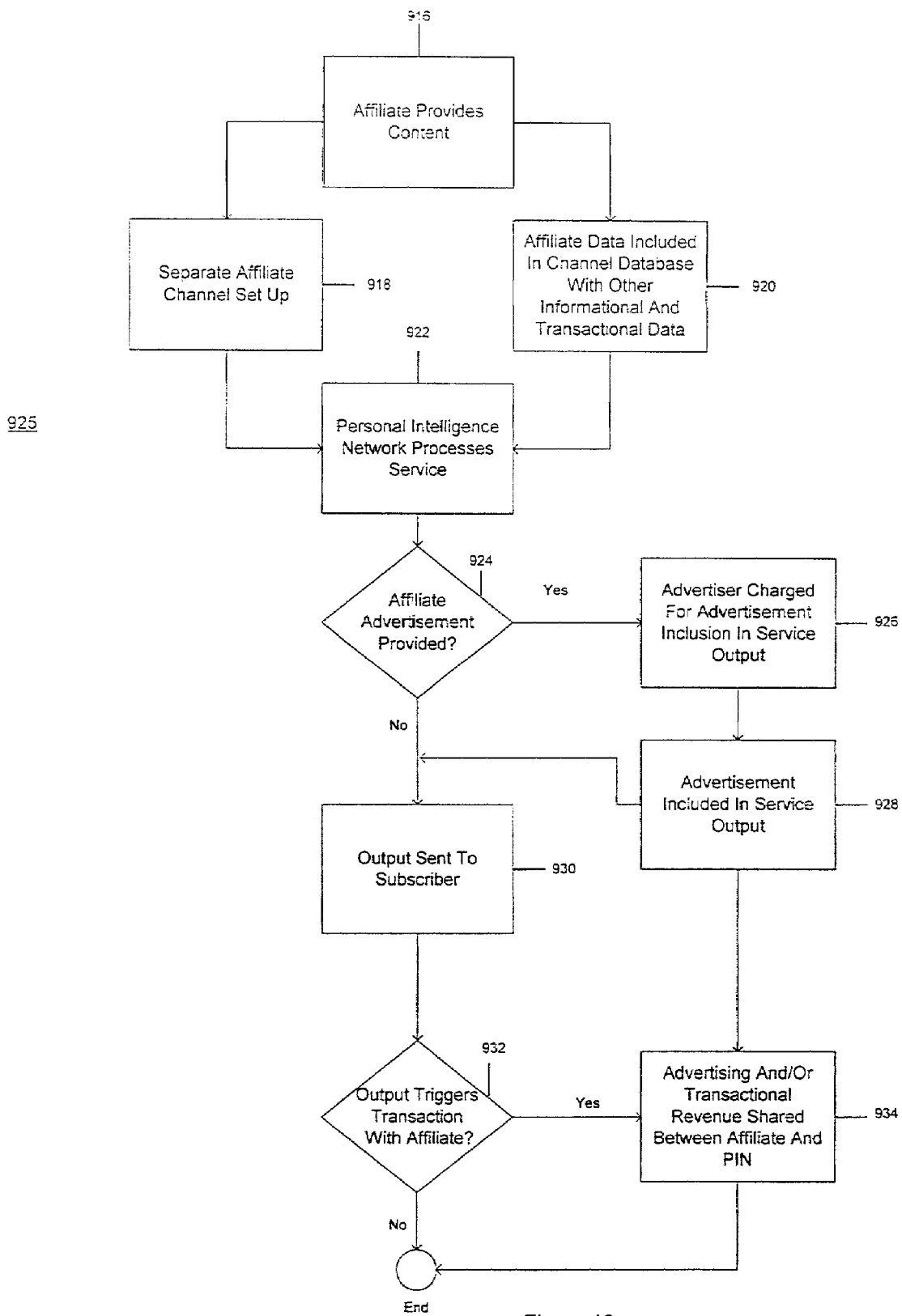
FIG. 19 depicts a flow diagram of a method of affiliate content provision to a personalized intelligence network system according to an embodiment of the present invention.

A method 925 is depicted in FIG. 19 relating a method for affiliates to provide input into the output generated by a PIN. In step 916, an affiliate may provide content to one or more of the channel databases. Methods for loading content into a channel database are described below and any of those methods or any other method of loading data may be provided. The affiliate content provided in step 916 may comprise transactional data, informational data, subscriber data, or any other data. That data may comprise continuous stream data from the affiliate, such as instant stock trades or current purchases as a retail store or may include periodically updated information. Also, the data may comprise data from the affiliate's data warehouse or other archival database that may describe subscriber's historical relationship with the affiliate. For example, if the affiliate is a bank, the data may comprise a complete transactional history of the subscriber with that bank so that the channel database is enriched with a broader base of data from which to generate reports. The data from step 916 may be loaded either into a pre-existing channel database with other informational and/or transactional data at the PIN (step 920) or may be used to create a specific channel for that affiliate (step 918). If an affiliate-specific channel is created, that channel may be limited in availability to only the affiliate's subscribers or may also be shared with other affiliate's subscribers.

Once the affiliate data has been loaded into a channel database, then in step 922, the PIN processes services based on the channel database content as detailed below. Next, in step 924, the PIN determines whether there is an affiliate advertisement to include in the service output. If so, then in step 926, a charge for including the advertisement may be generated (although it is also within the scope of the present invention to do so as part of the arrangement between the affiliate and the PIN).

In step 928, affiliate advertisements may be included in the service outputs. Affiliate advertisements may be advertisements about the affiliate or advertisements sold by the affiliate to a third party entity. For example, a newspaper may be an affiliate to enable its subscribers to subscribe to a news channel on the PIN. The newspaper may either run an advertisement in a service output for that newspaper or may sell a spot to a third party, such as a restaurant, hotel, etc. In either event, the affiliate may select an advertisement and supply the advertisements to the PIN to be included in service output. The advertisement selected may also be personalized based on predetermined criteria including the subscriber information, the type of service or channel being run, the time of day, the time of year, and the like. After step 928, then the PIN executes step 930 and step 934.

In step 930, the output is sent to the subscriber from the PIN using the system and method as detailed below, for example. After step 932, it is determined whether the service output triggers a transaction with the affiliate or another entity. If so, then step 934 is performed.

In step 934, as in step 914, revenues generated from advertising and/or transactional fees may be shared between the PIN and the affiliate. As described with respect to step 914, any method of revenue sharing and allocation may be provided. For example, the affiliate may receive all revenue from advertising, but the PIN may receive all revenue from transactional fees generated. The two may share all revenues evenly or according to a predetermined percentage. Revenue allocation may be determined also on a case-by-case basis.

In any event, through methods 900 and 925, the affiliate and PIN present content to subscribers and provide a system and method for generating revenue that may provide mutual benefits to all participants.

The PIN and affiliate may be connected over a network or the PIN may be installed with affiliate hardware. It is also possible to network affiliates together so that one affiliate may enable its subscribers to access content from one or more other affiliates. Affiliates may then enter into revenue sharing arrangements (e.g., based on relative usage of the content). For example, a travel web site affiliate may provide a travel channel to its subscribers and may also desire to enable its subscribers to access a weather channel provided by another affiliate.

It may also be desirable for the affiliate to be the source of the service output. Accordingly, the PIN may connect to an output server at the affiliate and pass the messages to be sent to the affiliate to send. For example, as detailed below the PIN has a mail server that sends mail messages generated from the PIN. In this embodiment, the mail server may be maintained by the affiliate.

As described below a number of different channels may be provided. Further, an embodiment of a PIN that may be used is detailed below. It should be understood that other channels and PIN systems may also be employed according to the present invention.

Figure 1:
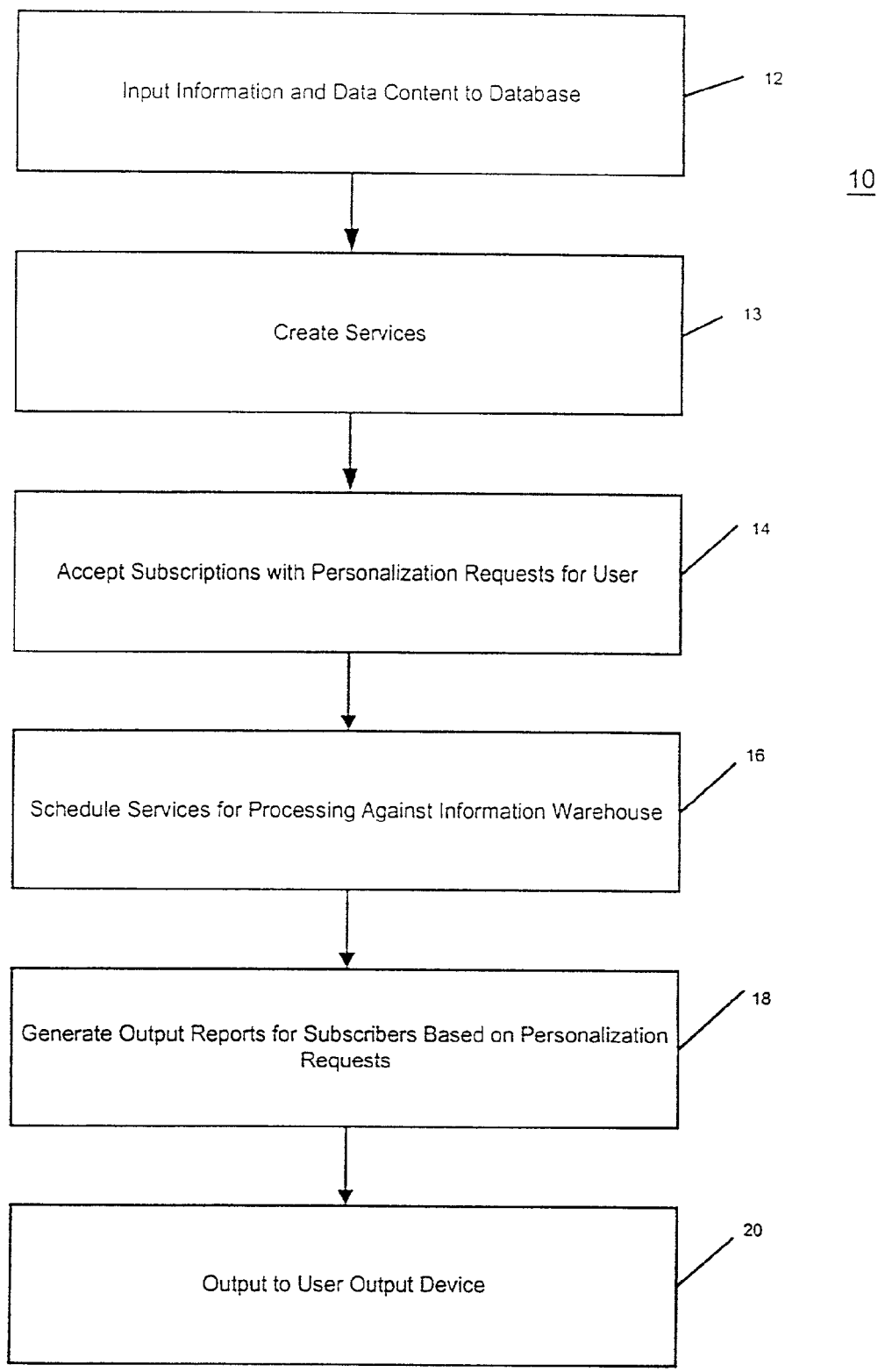
FIG. 1 depicts an embodiment of a method of processing services according to the present invention.

A method for delivering information and transactional data to users in an automatic fashion is depicted as method 10 in FIG. 1. Method 10 comprises several steps to implement a system for delivering personalized content to subscribers over a network to a user terminal device of the user's selection.

In step 12, input information is loaded into a database system, such as an OLAP system. The input information comprises the information, data, objects, and other input that populates the database from which the output is generated. For example, the information may contain both informational sources and transactional data compiled into one or more databases accessible to generate output to users. As discussed below, one method for loading data into the database may comprise using data load systems to take in raw data, cleanse the data and load it into a database in the desired format. Once entered, the database may indicate that the database has been updated so that certain automated outputs may be generated.

Additionally, according to an embodiment, the data may be organized into one or more "channels" of data. All data in a particular channel may have some relationship, such as by subject matter, date, type, etc. In a preferred embodiment, all channel data relates to the same general subject matter, such as sports, investments, weather, travel, etc.

Next, in step 13, one or more services may be created for each of the channels. Within each channel, a plurality of services may be provided and may be created by a system administrator or particular users upon request, for example. A service, as described above, provides content to subscribers from the database. In general, a service provides content from a report generated by processing database queries against the database. In one embodiment, traditional database query technology may be employed to process those reports that provide the content for the service. In one embodiment, decision support system technology in combination with OLAP systems may be used. Specifically, a ROLAP engine, such as the MicroStrategy Agent engine, may be employed to generate the content. In a preferred embodiment, the service is designed to generate content from a channel to subscribers to that service. Each service may have one or more subscribers to that service.

Next, in step 14, once a service has been created, one or more subscribers may subscribe to services. As part of the subscription, according to an embodiment of the present invention, the subscriber may be required to pay a fee, such as a per-use or periodic subscription fee. Additionally, as part of the subscription, for each service to which a subscriber subscribes, the subscriber may select personalization requests to be applied to the service. In general, because a service provides output from a report against an OLAP system, any filter, template, metric or other value that is generated in the report may be selected as a personalization option for the report. For example, a report may be provided to generate a portfolio summary. The user may personalize his or her subscription to that service by inputting his or her stocks, which would be available for the user to select because all stocks would be input into the OLAP system database for that Finance channel. Other personalization features may also be selected. As another basic example, the subscriber may sign up for a sports channel service provided by a method according to the present invention, but may only desire information about a particular sports team or even more specifically, a particular player.

Once personalization requests have been received by a user, in step 16, the predetermined conditions for processing a service are created and stored. Since there are three types of services—a scheduled service, an exception-trigger service and an initiation requested service, there are three types of predetermined conditions that may be established for processing a service. For a scheduled service, the service may be added to a calendar-like system that processes the service for all subscribers when the selected time has arrived. For example, for an hourly report, the service is placed on a calendar every hour and when the top of the hour arrives, the service is processed. It should be understood that services may be bi-hourly or even small increments as well. Also, the calendar may schedule services for any time within the hour. For an exception-triggered service, the service is only output to users when an exception condition occurs. The exception condition may be an alert, a trigger, or some other event, such as a third-party request, for example. When the exception condition occurs, then the service is processed. For an exception-triggered service, a monitoring process is used to determine how frequently to check to determine whether an exception has been satisfied or not. For an initiation requested service, the initiation type upon which to process a service may be specified. In either event, as a result of step 16, a service is stored for processing based on a predetermined condition.

In step 18, the service may be processed for each subscriber to that service to generate an output for each subscriber based on that subscriber's personalization requests. The processing of services may be performed using multi-tiered processing as detailed below in order to more quickly process the services for each of the plurality of subscribers.

Finally, in step 20, the output is sent to one of the user's selected terminal devices, such as a pager, e-mail, telephone, fax, HTML mail, or other output delivery methods automatically based on predefined preferences established by the subscribers to a system. Through this method 10, a personalized intelligence network is provided that takes information and transactional data and creates a steady stream of information that users desire in an automatic and expeditious fashion.

Figure 2A:
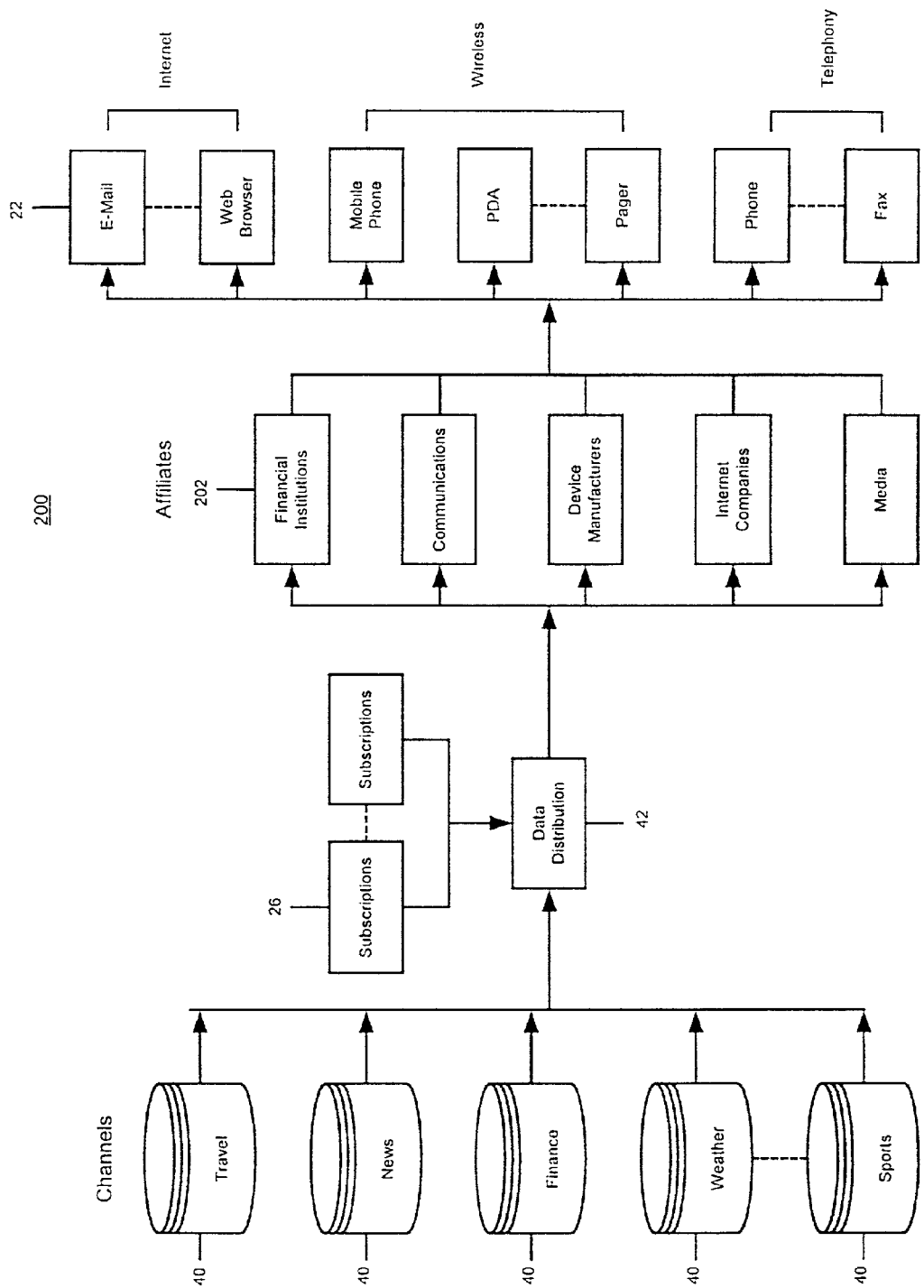
FIG. 2A depicts a schematic diagram of the flow of information in the personalized intelligence network of the present invention.

FIG. 2A depicts a schematic diagram of the flow of information in the personalized intelligence network of the present invention. The network 200 may comprise a plurality of channels including travel, news, finance, weather and sports, for example. The channels are then accessible by a data distribution system 42 that also is provided with subscriptions that may be stored in the channel or separately. Either directly or through affiliates, the data distribution system outputs content. The affiliates may comprise financial institutions, communications companies, device manufacturers, Internet companies, and the media, for example. The output may be provided to email, web browser or other Internet devices, to a mobile phone, personal digital assistant, pager or other wireless device, to a telephone, fax or other telephony device or to any other device available to receive information. The affiliates may either pass the output to the subscribers or may simply act as a contracting agent to obtain subscribers for the system. For example, an on-line investment site may offer its customers output of financial data but may not actually ever receive the information. Rather, the system may forward the financial data to the subscribers of the on-line investment site directly. In this embodiment, the affiliates essentially market the services of the system. Other arrangements are also possible.

As shown in FIG. 2A and discussed above, a plurality of channels may be provided and each channel may offer a plurality of services. Examples of the channels, services, and personalization options available are provided below.

A sports channel may include one or more of the following services: daily sports roundup, next week on TV, next week live, now playing alert, league roundup, your team's update, champion watch, player monthly, your team stats, league stats by player, league stats by team, intragame scores, live score alert, tickets alert, big event, one country one week, U.S. national team update, International teams, bets and odds index, coach room, training room, and playing room. Each of these services may be personalized to indicate the manner of notification, the alert type, which statistics to include, etc. Again, because OLAP technology may be employed, personalization may be applied based on any value available in the service report. Non-personalized services for the Sports Channel may include top sports stories, top of the week, world sports, women in sports, today in sports history, next week live, tickets weekly and many others.

A business channel may comprise one or more of the following services: business front page, your personal tech roundup, business forecasting for your favorite sectors, business statistics for your favorite companies, the currency watch, your personal commodity roundup, hot business stories in your favorite areas, hot stories for your favorite companies, finance watch for your sectors, bad apples in your favorite sectors, emerging market watch for your favorite regions, deals of the day in your favorite sectors, important appointments in the business world, the CEO that sleeps, reports on your favorite stock markets, top business stories for the day, Washington's business impacts, industries that are performing well, general economic predictions, unemployment news, tech roundup, unusual business watch, market watch, best business flying tips, business in Asia, investing tips by the experts, Euro watch, interest rate news, bankers corner, home and auto watch, world business daily review, interest rate change alert (anticipated and/or reported), company earnings report alert, stock market index drop alert, business travel deal alert, business personality article alert, entrepreneurial interest seminar alert, expected earnings deficiency report for company of interest, commodities percentage change alert, and currency percentage change alert, among others. In signing up for these one or more services, a subscriber may be asked for sectors, companies, indices, research services, currencies, personalities, news choices, business travel information, entrepreneurial interests, banking and other specific topics of interest. The subscriber may also personalize the device, schedule, output style, processing condition and other choices regarding the output from the service.

For a weather channel, one or more of the following services may be provided: current conditions, short-term forecast, extended 5-day forecast, pollen update, weekend watch, beach watch, special conditions alerts, severe weather alerts, detailed short-term forecast, sunrise/sunset/ tides/moons, driving conditions, airport closures/delays, special maps, ski watch, non-personalized weather conditions, non-personalized weather forecast, weather news, gardening watch, and aviation watch. In subscribing to the weather channel output service, subscribers may be prompted to input location portfolio information, output format, time zone, and other personalization features within each of the specific services based on the values of the report that are possible. For example, a user may only want to know the temperature in a forecast and not the precipitation portion of the forecast.

In a travel channel, one or more of the following services may be provided: personalized travel services, your reservation reminder, your ticket status, the fare watch, travel agency locator, electronic mapper, weather update, electronic ticket postman, frequent flier update/miles collected, currency converter, vacation watch, hotels of the date that suite your travel needs, best cruises available, best ski trips, adventure travel services, customs and duties report for countries, children travel report, travel heath information service, international cost of living calculator, appropriate destinations for appropriate times, seat locator, ticket purchase alert, flight cancellation alert, reservation cancellation alert, visa alert, and good fare alert. When signing up for one or more of these services, information regarding type of travel preferred for business and vacation, frequently visited cities, airline preferences, hotel preferences, budget parameters, kinds of vacations, type of food, car rental agency preferences, travel time preferences, travel day preferences, cuisine preferences, and travel companions. Terminal device, etc. may also be personalized as described herein.

In a finance channel, one or more of the following services may be provided: weekly portfolio summary, high 200-day moving averages by sector, low 200-day moving averages by sector, price-sales ratio by sector, annual total return by sector, broker recommendations by industry, P/E analysis by sector, book value analysis by sector, earnings growth rate to price appreciation by sector, comparison of dividend yields, earnings yields and P/E ratios of selected stocks by sector, today's winners by largest points increase, today's winners by largest money moved, today's loser's by largest points drop, low revenue growth alert, high revenue growth alert, stock split alert, new offering alert, new high's alert, new high's within my industry sectors, new low's alert, new high's for stocks in my portfolio, top price percentage gainer, lowest price percentage movers, top money movers in my portfolio, smallest money movers, above-average trading alert, market's largest money movers, portfolio's largest money movers, most actively trading stocks in my portfolio, low P/E stocks, low P/E's by sector, change in consensus estimate alert, analyst recommendation alert, above average trading alert, new 52 week high/low alert, stock split in portfolio alert, stock splits, comparable analysis on all portfolio stocks, tech sector update, sector trading analysis, earnings growth, latest twelve month financial update, P/E analysis, quarterly technical analysis, portfolio stocks by LTM revenues, portfolio stocks by capitalization, portfolio stocks by revenue and P/E analysis, portfolio stocks by capitalization and earnings analysis, dividend alert, quarterly sheets, cash flow statement, winners by sector, highest P/E by industry, lowest P/E ratios by industry, industry comparisons, sector comparison, new 52 week highs and lows by industry, top analysis recommendations, weekly analysis and portfolio summary, market update, currency analysis, intraday alerting (stock) and intraday alerting (currency), stock market news alert, stock market news analysis, sector indices, losers by market, earnings reports today, price alert, tech stocks, IPO center, IPO alert, and benchmark alert, for example. Additionally, when subscribers sign up for services on the finance channel, the following information may be input: frequency of updates, sectors of interest, currency of interest, stocks in portfolio, news interests, output methodology among other personalization options.

In a news channel, one or more of the following services may be provided: living, travel and entertainment tracker; science & technology/Internet & Computing tracker; heath & fitness tracker; business & finance tracker; politics & government tracker; sports tracker; U.S. news tracker; world news tracker; local news tracker; current affairs tracker; personality tracker; User name snap shot; breaking news; specials; User Name times (an aggregate newspaper); alerts; classifieds; and others. In this system, there may be personalized services, non-personalized services, aggregate services (services that allow aggregating different services into one service) and alert services. Within each services, there may be a plurality of categories and within each category a plurality of topics of interest that may be selected to personalize the content to the user. Subscribers may personalize this by selecting categories, topics, output delivery methods, particular items of interest, particular personalities, and many other personalization options as presented in the data that is being output.

Additionally, a Radio Channel may be provided for delivering personalized radio content (e.g., as sound files or directly played over a communication network including a digital radio network). A service may specify the type of music, news, etc. that the user desires to hear as audio output either via an Internet Real Audio connection, wav files played periodically over e-mail, directly to a PDA or telephone, or to an addressable radio device that is specially designed to play audio output. In this example, the information and content loaded into a channel may comprise audio data from radio stations across the country, specifically created content, news reports and other sound files that have been recorded and passed to a audio database repository for categorization and report generation using the present invention. Similarly, a Television channel may be provided to enable users to select personalized content for video relay. The video files may be output to an addressable video terminal device.

Figure 2B:
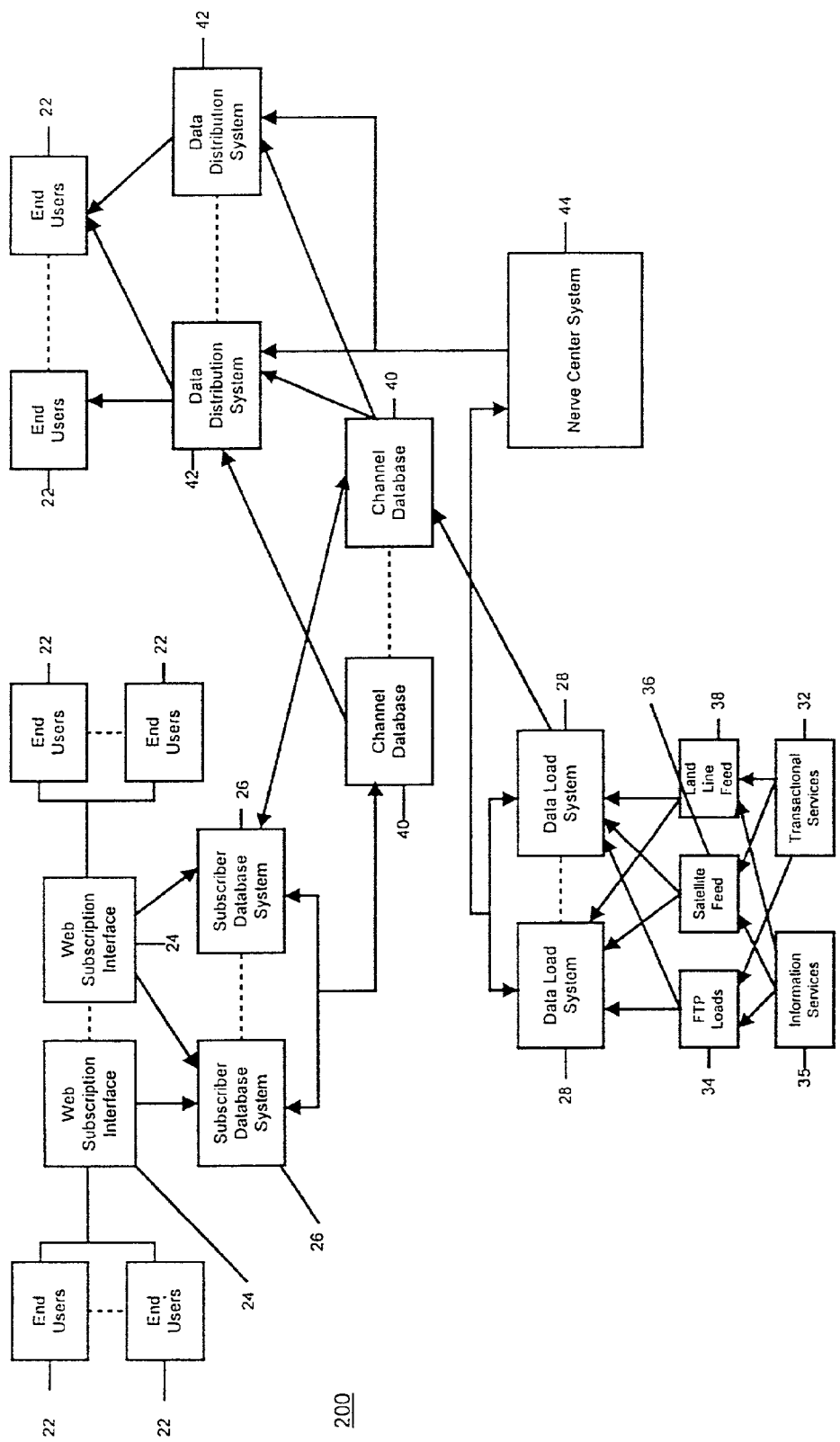
FIG. 2B depicts an overall system diagram of an embodiment according to the present invention.

An embodiment of a system that enables this type of method is depicted in FIG. 2B. Specifically, a system 200 may comprise a plurality of end users 22 operatively connected through a web subscription interface 24 to one or more subscriber database systems 26. Specifically, the web subscription interface may be provided to enable end users to subscribe to one or more channels and services that are to be delivered to the end user. The subscriber database system 26 may be provided to store subscriber information including personalization options as described in more detail below. Each of the subscriber database systems may be connected to one or more channel databases 40 that are used in the system to output information to users. Specifically, channel databases 40 may be populated with both information and transactional data from one or more data load systems 28. These data load systems 28 may receive information from one or more of the following: FTP load 34, satellite feed 36, and land-line feed 38. The information types may be information services 35 and transactional services 32 which may be provided to data load system 28 by one or more of the loading systems 34, 36 and 38. Once data has been supplied to populate the channel databases 40 and subscribers have input information into subscriber database systems 26, nerve center system 44 controls the processing of services based on subscription requests.

Specifically, nerve center system 44 controls one or more data distribution systems 42 that cooperate with channel database 40 and subscriber database system 26 to generate output to the subscribers one or more end users 22.

According to the present invention, users receive messages with output from services to which they subscribe from a data distribution system 42 which is part of the overall system 20. Data distribution system 42 receives a message from nerve center system 44 that instructs it to start sending messages for a service. (A service is a predefined message that a collection of users can subscribe to receive) Upon receiving the service launch authorization from nerve center system 44, data distribution control system 60 breaks the service into units of work, called jobs, which can efficiently be handled by data distribution servers 62. These jobs, which are smaller units of work may be dispatched to the data distribution servers 62 via OLE automation, although other methods of dispatch may also be employed. A data distribution server 62 receives the work and performs one or more of the following three separate tasks, 1) it retrieves the data for the service from the channel database 2) it formats the message and 3) it sends the message using the mail server system 72. The messages may then be viewed, heard, read, etc. by the end user.

Nerve center system 44 is the control center for system 200 to control and monitor all activity in the system. Nerve center system 44 may stop or restart processing of any component of the system as it communicates with all subsystems via a message queue system, such as the Microsoft Message Queue (MSMQ) system. Nerve center system 44 may also have a database that records the status of the system. Each of the subsystems are now described in reference to the following figures.

Figure 3:
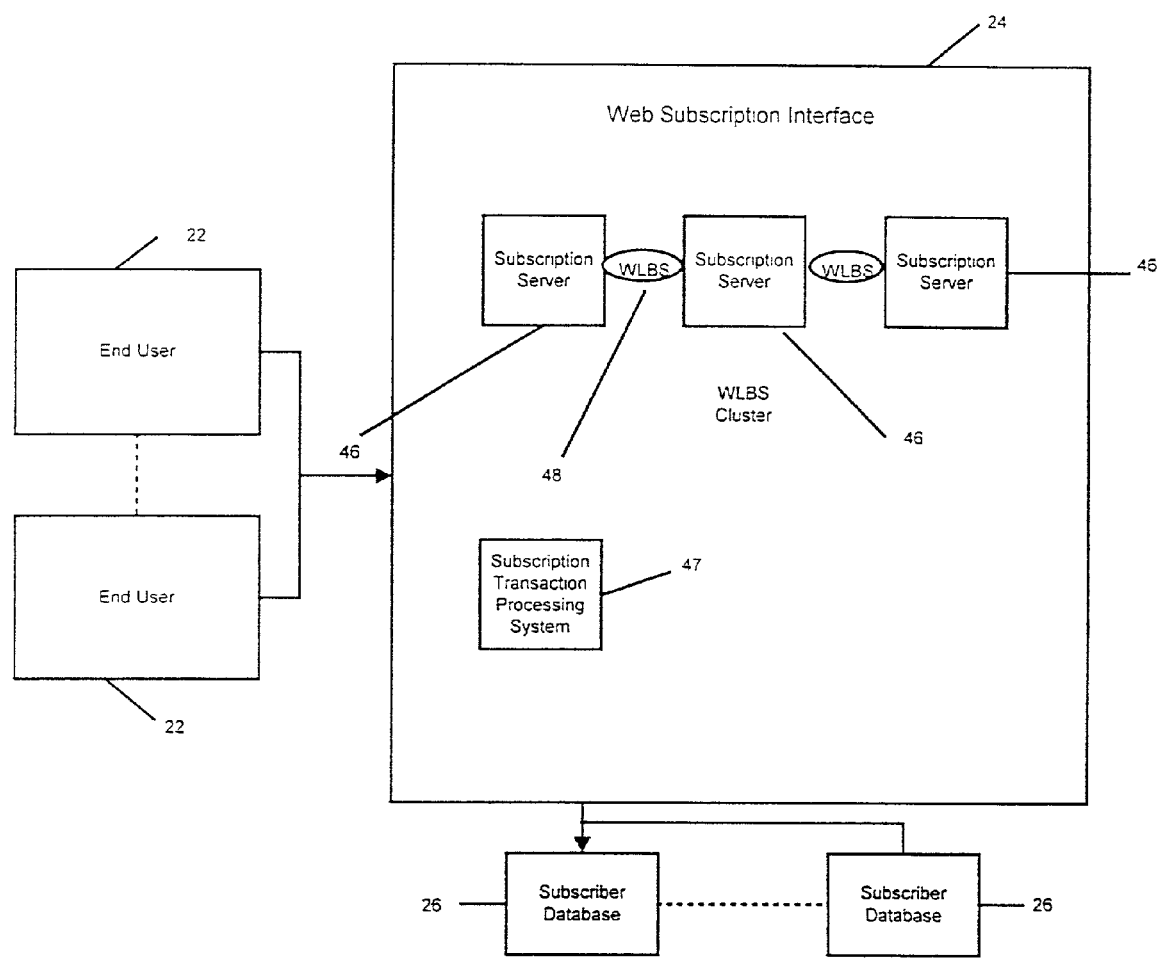
FIG. 3 depicts a web subscription interface according to an embodiment of the present invention.

FIG. 3 depicts an embodiment of a web subscription interface 24 according to an embodiment of the present invention. As described above, the web subscription interface 24 is provided to enable users to sign up to receive one or more services from one or more channels. To enable it to do so, web subscription interface 24 may comprise a web site and may cooperate with one or more subscription servers 46 connected by a web load balance system (WLBS) 48. Each subscription server 46 may be provided to handle the subscriptions for one or more of a plurality of end users 22 connecting to web subscription interface 24 over a network, such as the internet, or any other network system. Each subscription server 46 may enable users to subscribe to various services and personalize those services as described in more detail below. Additionally, a transaction processing system may be provided to execute transactions related to the subscription. For example, the subscriber may be charged a fee for the transaction and the subscription transaction processing system 47 may execute that transaction using credit card, electronic payments, or any other method of payment to execute that transaction. For example, an on-line payment system, such as one provided by Cyber Cash, may be used according to an embodiment of the present invention. Various other subscription interfaces may be provided according to the present invention, including telephone, regular hand carry systems or any other type of subscription interface system available. The web site for the web interface may comprise a web site delivered by a web server sold by Microsoft under the name Microsoft Internet Information Server (IIS). The web pages may comprise a combination of HTML and active server (ASP) pages. The subscription interface may comprise an Active Server Page (ASP) based architecture, using Microsoft's Internet Information Server (version 4.0). A load balancer may be provided to balance the load of processing a number of subscriptions. In a preferred embodiment, the Windows NT Load Balancer may be used to cluster many Microsoft Internet Information Servers (IIS) web servers together.

The pages are suitable to run on web browser systems, such as Microsoft Internet Explorer (4.0 and up) and Netscape Navigator (4.0 and up). The information collected by web subscription interface 24 may be stored in subscriber database system 26 which may employ a secure transaction server to store the data, such as Microsoft Transaction Server (MTS). The activity on the web site is balanced between all the web servers using a web load balancing system, such as Microsoft's Web Load Balance System (WLBS). Errors may be reported to nerve center system 44 via message queuing.

Because different channels may provide a different subscription interface, the system architecture may be flexible to allow it to be modified for these changes. The basic structure of the web interface allows users to easily get to the main actions that subscribers perform, such as creating an investment portfolio, signing up for investment services, and modifying their own profile.

The ASPs used in the system may be coded in VBScript and/or Java Script. ASP pages may be created using Allaire Homesite version 4. The HTML is compatible with HTML 3.2, HTML 4.0 and also some of Microsoft Internet Explorer and Netscape Communicator additions.

Connections to the subscription databases may be made using Microsoft's ActiveX Data Objects (ADO), using stored procedures to optimize query performance, together with replication mechanisms to provide a fast service to the web user. Additionally, core logical functions (such as creating, updating, saving and modifying a users profile, portfolio, etc) may be implemented in a middle layer of VB ActiveX DLLs that run inside Microsoft Transaction Server (MTS) version 2.0. These VB ActiveX DLLs are COM compliant and run in Apartment Threaded mode, a recommended threading model for web components.

Also by using Microsoft Transaction Service, the system has increased scalability and reliability. It allows database transactions to be performed using the industry standard Two-Phase Commit protocol to ensure database transactions are correctly performed, or rolled back correctly to a known state if there are errors. This helps to ensure reliability of users actions, too. MTS also allows ActiveX components and resources to be managed more efficiently to enable scalable solutions, which is critical in a web/Internet environment. It achieves this without consuming too much memory and other essential operating system resources.

The web subscription interface is also scalable because through the use of web load balancing systems, additional subscriptions servers may be added to the system as desired without requiring any additional equipment or coding. Further, through using a Microsoft SQL 7.0 SQL server, segmentation of transactions may be possible so if a particular transaction is taking too long, it may be segmented and processed by multiple servers in parallel. Also, through the connection of the web subscription interface on either a T3 and a plurality of OC3 fiber, bandwidth may be added as desired.

Figure 4:
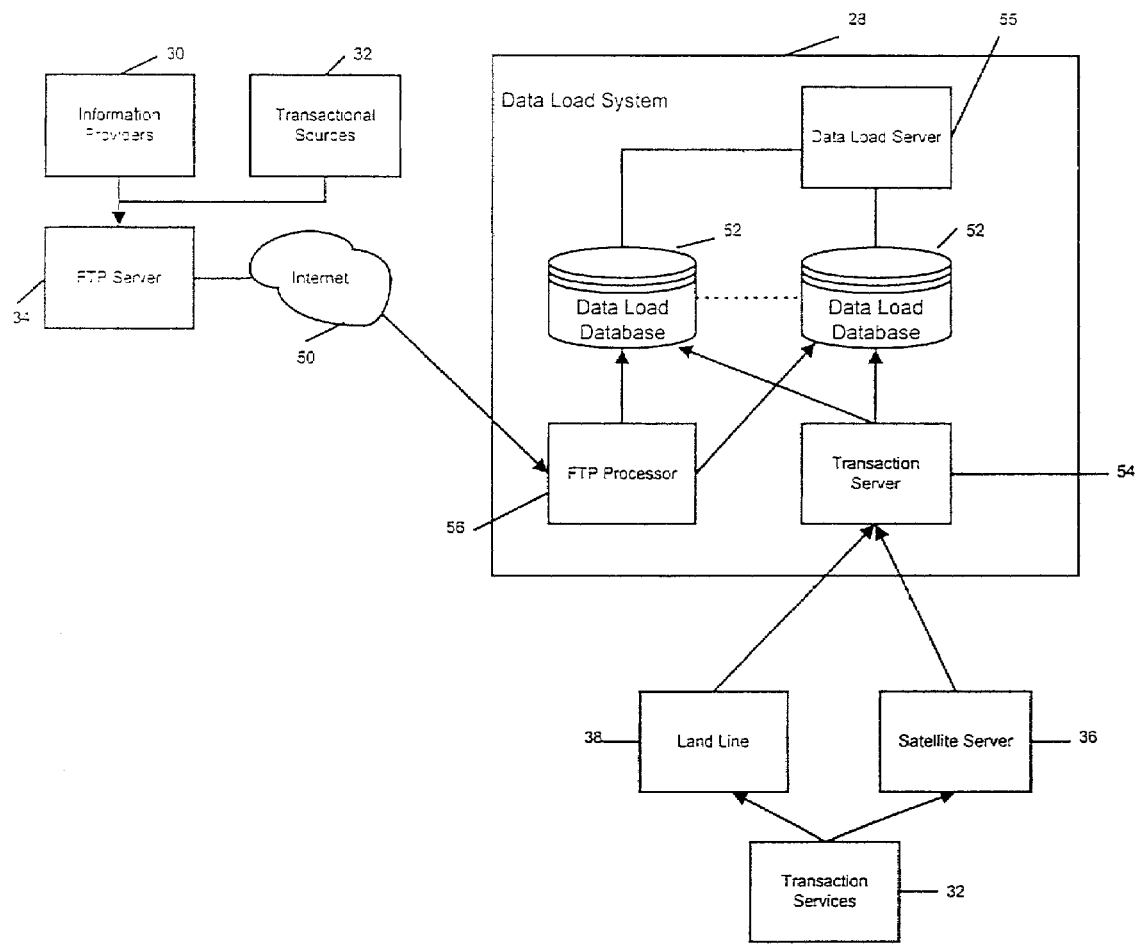
FIG. 4 depicts a data load system according to an embodiment of the present invention.

FIG. 4 depicts another portion of system 200 according to the present invention, and in particular, depicts a detailed embodiment of data load system 28. Data load system 28 may comprise an FTP processor 56, transaction server 54 and one or more data load databases 52. The transaction server 54 may connect to land-line 38 and satellite server 36 to receive information downloaded into one of data load databases 52. An FTP processor 56 may be provided to enable FTP server 34 to download information provider and transaction source information over the internet or any other network 50 into data load databases 52.

Data feeds are provided to collect data from data providers that may include informational sources and transactional sources. Data feeds may be supplied through satellite, land line, or FTP, among others, as depicted in FIG. 2B. Also, data may be loaded into the channel databases 40 for use in data distribution. The data may be parsed before it is loaded into our channel databases for use in the system. Data feeds may be provided from one or more of the following sources, for example, Standard & Poor's ComStock, Inc. (www.standardandpoors.com) and Zacks Investment Research (www-.zacks.com) for financial information. Other data feeds may also be used and these examples are not intended to be limiting, but merely illustrative of the types of data feeds that may be used according to various embodiments of the present invention.

The basic processing for a data feed may be employed regardless of the source of the data. A feed is received and parsed. The parsed feed is placed in a local temporary database. Once the feed processing is completed and verified, the data is moved from the feed database to the channel database through pre-tested SQL scripts which populates the channel data model. Once the data is stored in the channel database nerve center system 44 via message queuing is informed the data is present and ready for use.

Data feed processing is the process of receiving data from a vendor at regular intervals, and placing the data into a channel database. Processing is preferably performed in a timely manner to assure the data in the channel database is current and correct. The programs are written in C++ to parse the data quickly and use MSMQ to communicate with nerve center system 44 and a transaction server, such as Microsoft Transaction Server to send database transactions to the data server.

Feeds may arrive in two ways; either as a continuous data stream (e.g., a satellite or leased line) or in a file to be processed (e.g., FTP file). Examples of information feeds that may be accepted for input to the channel databases of the present invention include Standards & Poors's Current Day Financial Market Data that may be provided as a streaming data feed through a satellite line, Zack's Analysis Information that may be downloaded using FTP over the Internet at six intervals during the day, Briefing.com's Stock Splits and IPO information and calendars that may be delivered once a day through FTP over the Internet, Media General Financial Services's Detailed Financial Company Data that also may be provided once a day using FTP over the Internet, Accu Weather's Weather forecast and weather data that may be sent via FTP over the Internet about 30 times per day, and Weather Labs' Weather forecast and weather data that may be downloaded over the Internet about 30 times per day.

Figure 5:
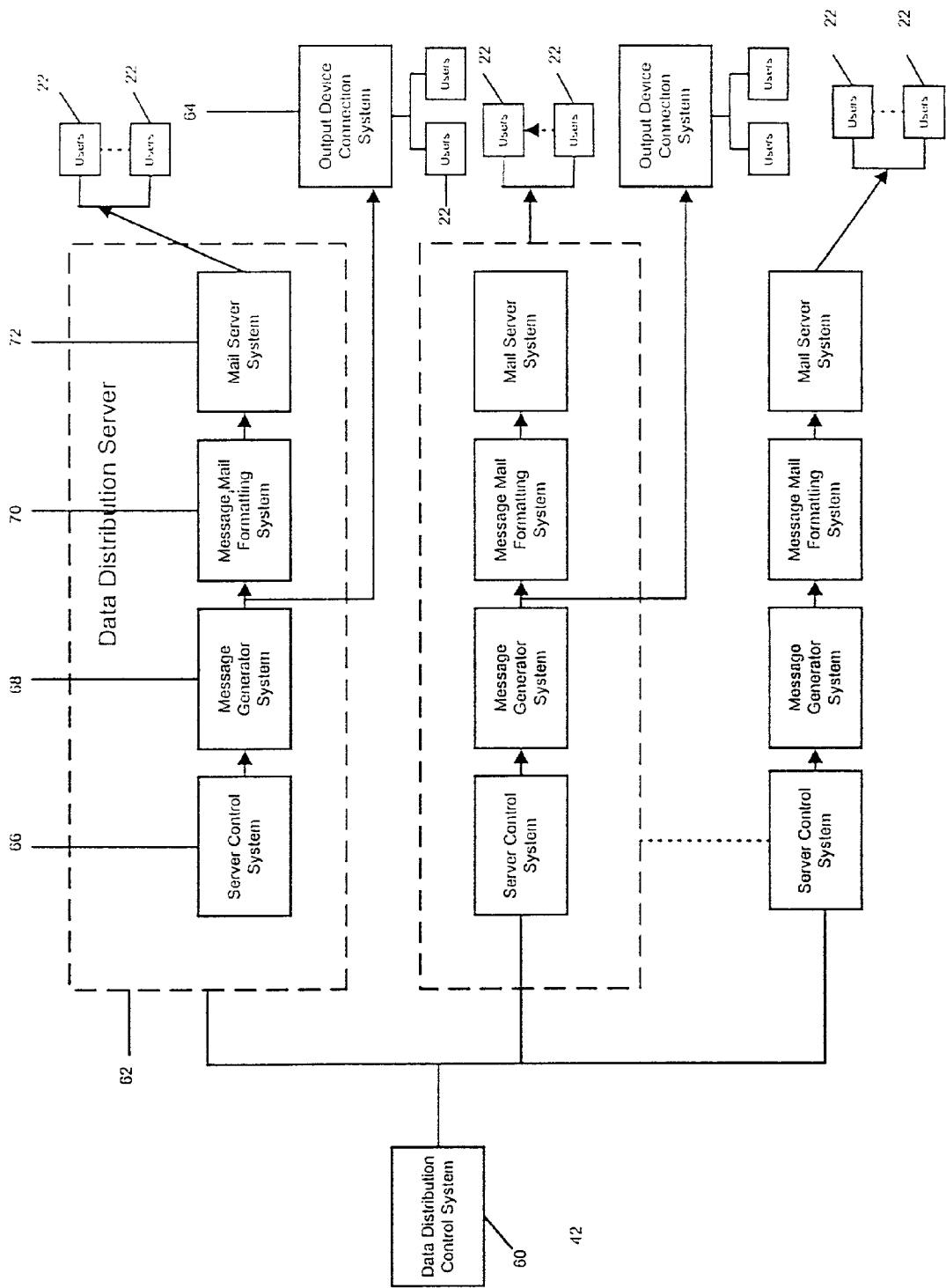
FIG. 5 depicts a data distribution system according to an embodiment of the present invention.

FIG. 5 depicts an embodiment of a data distribution system 42 according to an embodiment of the present invention. Specifically, data distribution system 42 may comprise a data distribution control system 60 that connects to the nerve system 44. Data distribution control system 60 may control one or more data distribution servers 62. Each data distribution server may comprise a server control system 66, one or more message generator systems 68, one or more message mail formatting systems 70 and one or more mail server systems 72. The output of data distribution server may be provided directly from mail server system 72 to one or more end users 22. Alternatively, output from message generator system 68 may be provided to an output device connection system 64 and from there provided to one or more of a plurality of users 22. Specifically, output device connection system 64 may be provided if the user desires to receive the information form a source other than an electronic mail system. Mail server system 72 may provide electronic mail directly to users 22. Output device connection system may comprise a system that takes an electronic mail message and converts that to a format for another terminal device. The use of styles may be employed as utilized in MicroStrategy's Broadcaster application.

Data distribution system 42 may comprise software coded components operated on hardware systems. In an embodiment, both message generator system 68 and message mail formatting system 70 may be provided on a single processing system. The software coded components may comprise Visual Basic 6.0 code that loads data from the Channel Databases and sends that information to end users, whether there is only one or millions. These messages can be sent to pagers, mobile phones, email servers, fax machines, personal digital assistants, as HTML pagers, telephone, and other terminal devices. It achieves this scaling by a multiple-tier architecture that allows for load balancing and scalability on many data distribution servers 62 controlled by one data distribution control system 60. Data distribution system 42 retrieves the data for messages, formats these messages, and sends them through mail server system 72.

Data distribution system 42 may comprise six main components. A data distribution control system 60 controls the operation of the data distribution system 42. Server control system 66 comprises the control unit for each of the data distribution servers 62 controlled by data distribution control system 60. Additionally, each data distribution server 62 comprises a plurality of message generator systems 68 that generate messages. The server control system 66 controls the message generator system 68. Message mail formatting system 70 prepares and formats reports generated by message generator system 68 into a mail message ready for transmission by mail server system 72 which in turn sends out the messages. A data distribution repository which is part of the nerve center repository holds parameters for sub-services.

Data distribution control system 60 is the control center for the data distribution system 42 and provides the user interface for controlling data distribution system 42. Any actions that need to be taken may be performed through data distribution control system 60. These actions include pausing/canceling sub-services, running sub-services manually, and upgrading sub-services.

Data distribution control system 60 receives its instructions from nerve center system 44, retrieves information from nerve center repository 80, and controls the various data distribution servers 62 through their server control systems 66.

According to an embodiment, data distribution control system 60 resides on a separate machine from the various data distribution servers and controls a plurality (e.g., five) data distribution servers 62 that create output, such as emails, to subscribers of services. When a sub-service is set to run, nerve center system 44 authorizes data distribution control system 60 to begin running this sub-service. Data distribution control system 60 then splits this sub-service into many separate jobs, which it then sends to the various data distribution servers 62. If five data distribution servers 62 are provided, then each sub-service may be split into five jobs. It is also possible to split a sub-service into more or fewer jobs than the number of data distribution servers 62. According to an embodiment, the splitting may be done by subscriber to a particular sub-service, as shown below with respect to FIG. 8. Splitting into multiple jobs and separately processing those jobs may be performed for scalability and for load balancing purposes. One data distribution control system 60 machine can effectively use many data distribution servers 42 to their full processing power.

In an embodiment, the jobs created may be spread between five different data distribution servers 62. The jobs may be created with about the same number of subscribers for processing so that each job takes approximately the same amount of time. If each subscriber were the same and each job had the same number of subscribers, then each data distribution server 62 would finish its job at the same time. Generally, however, this is not the case because subscribers create different personalization options that which make a subscriber's service request longer or shorter to process. Accordingly, as described below, when a data distribution server 62 finishes before others, that data distribution server 62 may be instructed by nerve center 44 to begin another job, even another job from another service. A method accordingly is depicted with respect to FIG. 17 described below.

As an example, for one sub-service, the system may create fifteen jobs, each of which has the same number of subscribers. Each data distribution server 62 may be assigned one job, and upon completion of that job, receives another job. This process continues for all fifteen jobs, until the service is "signed out" (all jobs have been assigned), at which point the next sub-service is started and those jobs are assigned to the available data distribution servers 62. In that way, each data distribution server 62 is constantly working on a job, and the work is shared equally among all the servers.

Splitting is also done for fault tolerance. If one data distribution server 42 goes down, the data distribution control system 60 can easily reallocate jobs to run on the remaining servers.

In addition to load balancing and fault tolerance, however, splitting also allows data distribution control system 60 to scale to many more than five data distribution servers 62 as shown in an example relationship described above. Data distribution control system 60 is flexible enough to handle different numbers of data distribution servers 62. Given the rapid speed increases in processors, it is possible that fewer numbers of data distribution servers 62 may be provided as well, especially as processors start breaking the 1GHz mark, and off-the shelf systems can scale beyond four processors.

Additionally, according to another embodiment of the present invention, it may be desired to give higher priority to certain services than others and the system may then process those services prior to lower priority services. A high priority service such as a tornado alert service may then be processed higher than a lower priority services such as a weekly briefing book. Therefore, data distribution control system 60 may handle priorities of jobs accordingly to most effectively output priority services.

Data distribution control system 60 may comprise a standard executable written in Visual Basic 6.0 and operating on a processor. To communicate with nerve center system 44, an API system may be employed that leverages message queuing, such as Microsoft Message Queue 1.0. To communicate with each server control system 66 of each data distribution server 62, OLE Automation may be employed, for example. To connect with the data distribution system repository 80, data distribution control system 60 may employ Microsoft ActiveX Data Objects (ADO). Other system for communications may also be used within the scope of the present invention.

Server control system 66 is the control center for a data distribution server 42. It receives instructions from data distribution control system 60 and is in charge of the message generator systems 68, which are the modules (e.g., software executables operating on a processor) that generate the messages for a particular sub-service. In an embodiment of the present invention, each data distribution server 62 may comprise one server control system 66.

When a server control system 66 receives a command from data distribution control system 60 to run a sub-service, it creates numerous instances of message generator systems 68 for the sub-service it is running. This allows for the processing power on the data distribution server 62 to be maximized. Then, similar to how data distribution control system 60 splits a sub-service into many jobs, the server control system 66 splits its job into many batches. It runs these batches on the multiple message generator systems 68 it has instanced.

As a further speed enhancement, server control system 66 may handle public (non-personalized) information differently than it handles personalized information. Since public information is the same for all users, it is only created once and passed to each instance of a message generator system 68. Since personalized information is different for each subscriber, it is created for each subscriber on each message generator system 68. By only calculating public information once, data distribution server 42 may output public-only sub-services more quickly.

Additionally, a version of server control system 66 known as a "Debug-server control system" may be provided to enable content creators to make message generator systems 68. That component simulates a call from the data distribution control system 60 and allows the user to resolve and test the message generator systems 68 thoroughly before working on the more complex data distribution control system 60/server control system 66/message generator system 68 architecture.

In an embodiment of the present invention, server control system 66 may comprise an ActiveX executable written in Visual Basic 6.0 that operates on a processor machine. Being an ActiveX executable allows for communication via OLE automation from data distribution control system 60. Server control system 66 may use OLE automation to communicate with the message generator systems 68 and may use ADO to log errors and statistics to nerve center system 44 database.

A message generator system 68 creates and formats the messages for a particular sub-service. The message generator system 68 may comprise an email retrieval module that retrieves electronic mail information including header and footer information, a personalization retrieval module that executes a personalized report on the channel database and a non-personalized module that retrieves the non-personalized information, such as from another message generator system 68 that processes the non-personalized information.

In general, message generator system 68 generates HTML emails, plain text emails, pager messages, or mobile phone messages, create charts for embedding in HTML emails, voice-mail messages, and fax messages. Each message generator system 68 may be created from a sub-service template. Use of this template allows for content creators to focus on the content's formatting and data, and leaves the scalability and load balancing already in place.

Message generator system 68 is called from the server control system 66 and is instanced multiple times to maximize processor usage. Each instance of message generator system 68 also instances a message mail formatting system 70, which may be run as an in-process DLL. If message generator system 68 does not create messages (e.g., when a chart is created to be sent), then message generator system 68 does not call a message mail formatting system 70 DLL.

In an embodiment, if a service comprises a number of sub-services, then to increase processing efficiency, one message generator system 68 is instanced for each sub-service. For example, if there are thirty sub-services and five data distribution servers, then server control system 66 may create thirty message generator system 68 on each data distribution server 62, for a total of 150 message generator systems 68 processing the service. Message generator systems 68 may be maintained by data distribution control system 60, which takes care of version control and distributing code to the machines.

A message generator system 68 may be started from a server control system 66 and is instanced multiple times, again, to maximize processor usage. Each message generator system 68 receives a batch from a server control system 66. For each batch, the Message generator system 68 retrieves data from the database, formats the data, and sends messages through the message mail formatting system 70 DLL. When it is done with a batch, it receives a new batch from server control system 66. Many of the items in a message generator system 68 are parameterized and stored in a database so that changes can be made without having to recompile the message generator system 68. This is especially useful when running a test from a different channel database. When all the batches for a job are done, the server control system 66 closes the message generator systems 68.

When an error occurs in a message generator system 68, this error "bubbles up" to the server control system 66. Along with the error message, many important parameters are passed to uniquely identify where and when the error occurred. This allows for easier debugging and problem solving.

Message generator systems 68 may comprise ActiveX executables written in Visual Basic 6.0. This allows it to communicate with server control system 66 through OLE automation. Message generator systems 68 may use ADO to connect to the channel databases.

Message mail formatting system 70 takes the messages from message generator system 68 and puts them in a format that mail server system 72 can send. For example, in a preferred embodiment, mail server system 72 may comprise an SMTP server. Accordingly, message mail formatting system 70 may create an SMTP email message.

Message mail formatting system 70 may run as an in-process DLL for each instance of a message generator system 68. It receives an array of the formatted messages and then it adds headers and other syntax that allows mail server system 72 to understand where to send the message. Message mail formatting system 70 may derive the information for the headers and syntax from the subscriber information in the channel database that may be passed from the message generator system 68 from processing a particular subscriber/service.

In a preferred embodiment, one message mail formatting system 70 may be provided for each data distribution server 62. Message mail formatting system 70 may add the final portions to an email message so that an SMTP server can send it to the correct recipients. It places these finalized messages into a pickup directory of mail server system 72. Message mail formatting system 70 may comprise an ActiveX DLL written in Visual Basic 6.0.

Mail server system 72 may comprise a mail transport protocol server that quickly sends emails over the Internet. Mail server system 72 may comprise a pickup directory (e.g., a location on a hard drive of the processor running the mail server system 72) that it constantly pools for new messages which message mail formatting system 70 drops in the directory. There may be a plurality of mail server systems 72 for each message mail formatting system and the load may be distributed by an OLE server spawner and a plurality of OLE automation servers.

When message mail formatting system 70 drops messages into this directory, mail server system 72 resolves the host machine's IP address, connects to the host machine for that recipient, and sends the message over TCP/IP. If it fails to connect and send the message, it then places the message in the Queue (e.g., another directory on the hard drive of the processor) and then retries to send the message at a user-defined interval and number of attempts. If it fails to send the message after these attempts, it places the message in the BadMail folder where it stays for human intervention. In an embodiment, mail server system 72 may comprise an Option Pack add-on for Microsoft Windows NT Server.

Data distribution repository 82 may comprise a database on nerve center repository 80 that holds many parameters for the sub-services. Data distribution repository 82 is called from Data distribution control system 60 to retrieve the parameters for a service. The Data distribution repository 82 holds the parameters for the various sub-services. These parameters include the SQL and names of stored procedures to retrieve channel data, and many other user-defined parameters that are kept in a database so that changes can be easily made without recompiling message generator system 68 code. Data distribution control system 60 passes these parameters to the server control systems 66. In an embodiment, data distribution repository 82 may comprise a SQL Server 7.0 database.

The system of the present invention is capable of effectively processing about one million subscribers daily using five data distribution servers 62. The system is also scalable to handle greater numbers of subscribers by adding additional T3 lines for output from the mail server systems 72 and additional banks of data distribution servers. It may also be desirable to add additional data distribution control systems 60, each one being responsible for controlling a plurality (e.g., five) data distribution servers 62.

Figure 6:
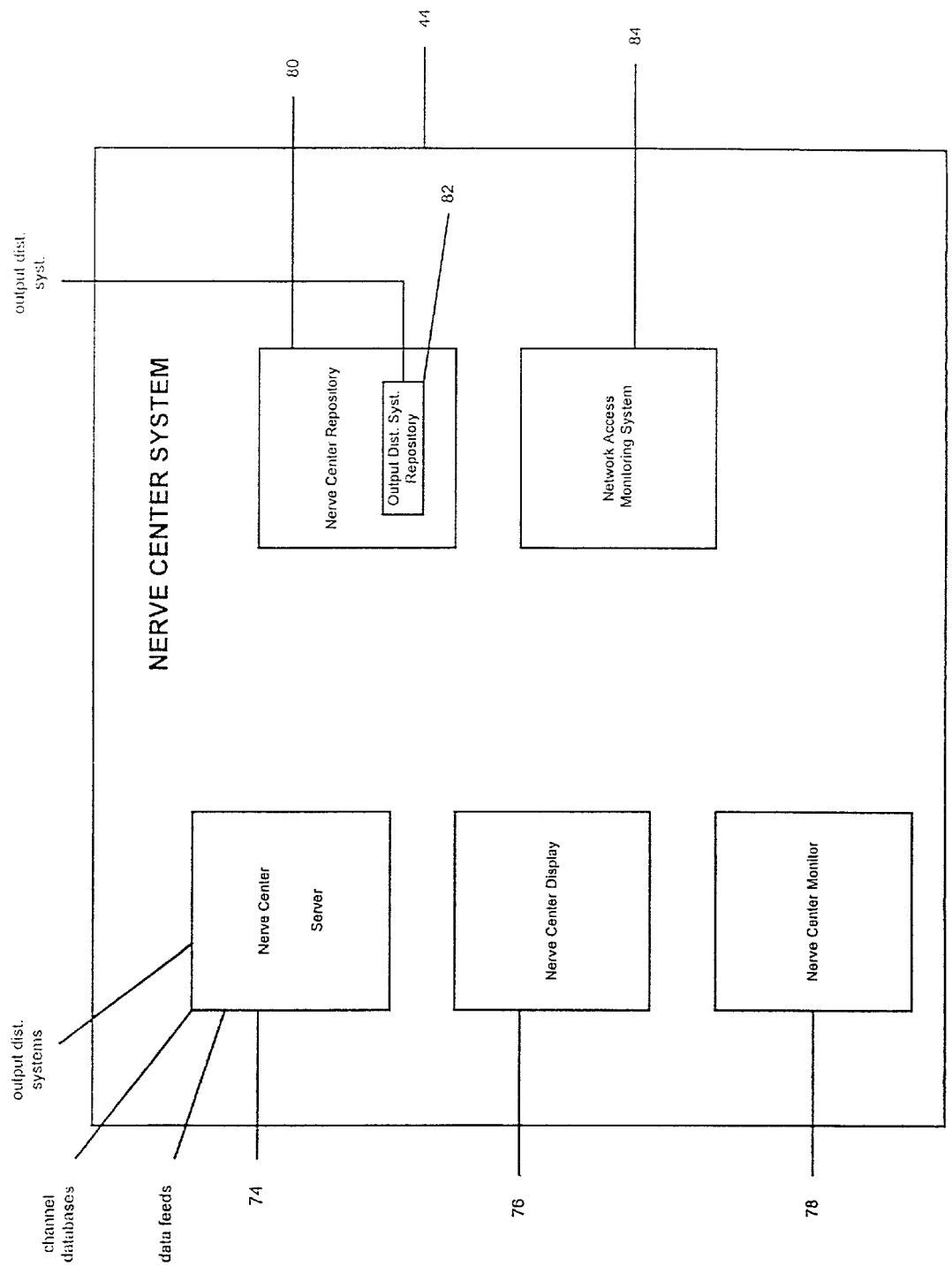
FIG. 6 depicts a nerve center system according to an embodiment of the present invention.

FIG. 6 depicts an embodiment of a nerve center system 44 according to the present invention. Never center system 44 may comprise a nerve center server 74 connected to data feeds channel databases and output distribution systems. Additionally, a nerve center display 76 may be provided a nerve center monitor 78 provided a nerve center repository 80 provided and a network access monitoring system 84.

Nerve center system 44 is the control center for the entire system. It controls when sub-services are run, grants permission to sub-services after scanning the channels databases for data integrity, and polls whether the machines in the network are up. Nerve center server 44 functions as the hub for service processing because it mainly monitors when the data distribution system 42 should begin processing services.

Nerve center system server 44 may utilize message queuing, such as Microsoft Message Queue, to communicate with data distribution system 42, data load system 28, and channel databases 40. Nerve center server 44 communicates with other components in the system by messaging, such as using Microsoft Message Queue Server technology which provides connection-less communication, guaranteed delivery, efficient routing, and transactional messaging. Also, a messaging API, which is an ActiveX DLL component that can be accessed from multiple ranges of programming languages including Visual Basic, VBScript, and Visual C++, may be provided. Through this API, administrators use a common language of communication and to simplify cross-team MSMQ implementation and deployment.

The nerve center system 28 schedules services in a data driven manner. Therefore, even if a service is a scheduled service, the service may not be processed until the data to be used in that processing has been input into the channel on which the service is to be run. The nerve center system 28 monitors the data load schedule for a slippage, delay, or other exception cases and performs checks on the data and other system components. When the system is ready to go and the data is ready in the channel database, then the nerve center sends an instruction to a data distribution system 42 to process a service or alerts the operator if detected failure is found.

The goal of the data check is to prevent sending services with incomplete, inaccurate, not up-to-date, or repeated information. The system thus may check for potential problems including 1. The information is the same as previous service interval, e.g., in a finance channel, all stock quotes from NASDAQ remain unchanged for consecutive periods of time.

2. The information is not complete, e.g., all stock symbols from S–Z are not contained in the data feed.

3. The information is incorrect, e.g., stock price is off from the actual value.

If one or more data check conditions are true, then the administrator may be notified and the service may either be delayed or canceled.

The nerve center display 76 allows monitoring of all major components of the system from the status of the actual hardware (like CPUs on servers) to the status of all services. Statistics such as current subscriber totals and services sent in the last hour may also displayed for a system administrator or other authorized system participant.

The nerve center monitor 78 may comprise a display window that tracks the diagnostics of the system. It may be available to administrators and operators that need to keep watch the system and may float to the top to keep in the eye of the administrator or other authorized system participant.

Nerve center repository 80 may be provided to contain a database for errors and statistics that are gathered on the performance of the system. This allows complex analysis to be run, using tools including MicroStrategy's known DSS Suite. Many reports and alerts will be based off of the information that is stored in nerve center repository 80. The nerve center repository may comprise a Microsoft SQL Server 7.0 database.

Figure 7:
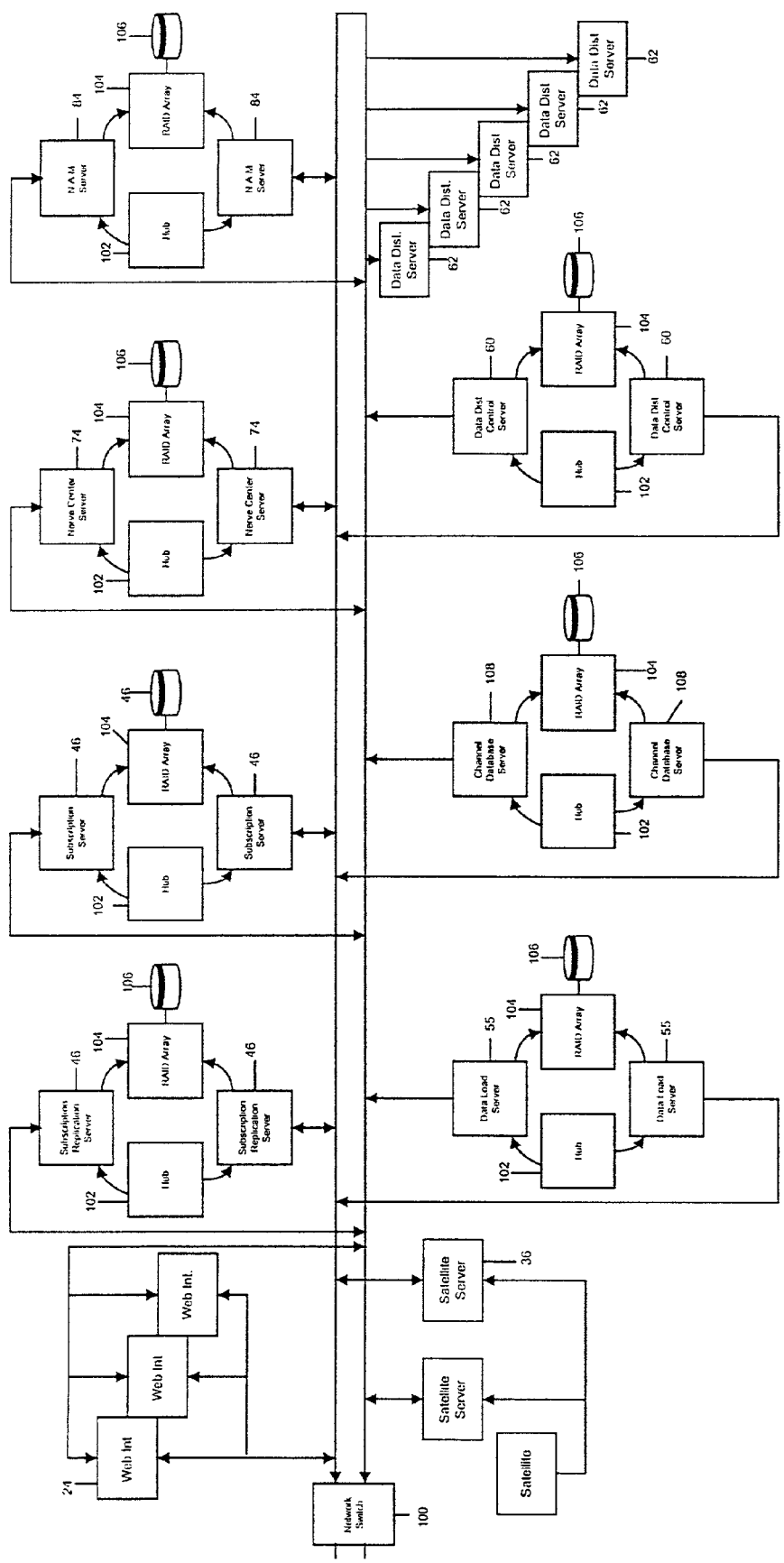
FIG. 7 depicts an overall network diagram with a network switch according to an embodiment of the present invention.

FIG. 7 depicts a networked embodiment of the system according to the present invention. Specifically, a network switch 100 may be provided with a dual input bus across which all of the components of the system are connected. Dual input may be provided to provide redundant access to the switch with redundant components provided throughout. Specifically a plurality of web interfaces 24 may be connected to the dual input as well as the plurality of satellite servers 36. Various server clusters may be provided with a redundant servers, a hub, an RAID array and a database 106. The cluster hubs may comprise a cluster based on the subscription replication server 46, the subscription server 46, nerve center server 74, network access monitoring system 84, data load server 55, channel database server 108, and data distribution control server 60. Additionally, a plurality of data distribution servers 62 may be connected to the bus.

The network depicted in FIG. 7 may comprise a communications network provided by Exodus Communications that provides flexible, reliable bandwidth to the Internet. Within an IDC, Exodus configures a LAN as a "ladder" model, with two of each component working in tandem to preclude the existence of a single point of failure. While routers are linked in a redundant "mesh" design, IDC switches use Hot Standby Routing Protocol (HDRP) to ensure one router is constantly available to take on the load of another should it experience unexpected downtime.

Using fiber paths from multiple vendors, each IDC LAN links together to form the nationwide Exodus backbone. Redundant Cisco 12000 backbone routers within each IDC guide traffic flow to minimize traffic hops. Additionally, Exodus utilizes numerous (140+) private and public peering arrangements to provide for the fast, efficient delivery of data even in the event of an Internet disaster. Also, the system may utilize a 100 MB burstable link to the Internet. Additional bandwidth can be added at any time to support additional requirements.

Switch 100 may comprise a Cisco 5509 switch with redundant power supplies, supervisor modules and 100 MB port cards. A spare 100 MB port card may be provided in the switch 100 pre-racked in case of catastrophic switch failure. For security, the network may utilize redundant Cisco PIX firewalls between the Exodus network and the internal channel/subscription processing network. The PIX is a hardware based, stateful inspection firewall which is capable of providing filtering for two fully saturated T3 connections with no delay in processing and in lab tests has been rated with a throughput as high as 150 Mbps. In addition, the PIX provides great flexibility in configuring outside access network interfaces or even specific IP addresses and ports. The PIX firewall uses a series of rules to determine access to specific network interfaces, IP addresses and ports. Other networks and security measures may also be used to prevent infiltration of system as one of ordinary skill in the art would recognize.

Figure 8:
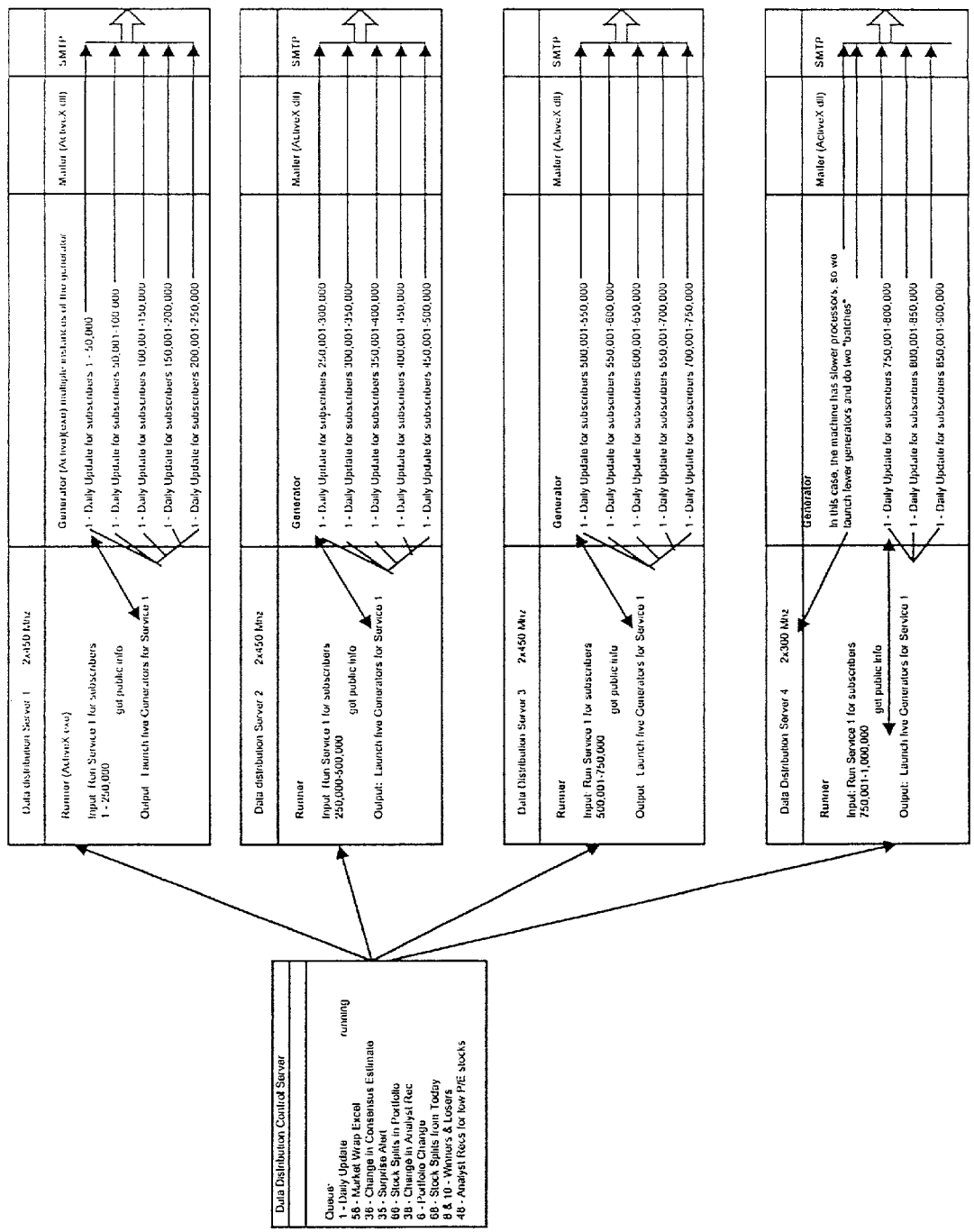
FIG. 8 depicts an example of a processing output according to an embodiment of the present invention.

FIG. 8 depicts an embodiment of a method of processing according to the present invention using data distribution control server 60 and data 20 distribution servers 62. As depicted in FIG. 8, the data distribution control server has a queue of services to be run by that particular data distribution control server. The services may include a Daily update, market wrap for Excel™, change in consensus estimate, surprise alert, stock splits in portfolio, change in analyst recommendation, portfolio change, stock splits from today, winners and losers, and analysts recommendations for low P/E stocks. These are but a few examples of the various services that may be in the queue for the data distribution control server and begin processing that service under control from the nerve center 44.

For example, in the example provided in FIG. 8, the daily update has a million subscribers to that service. Accordingly, the service has been broken up into four separate jobs, each job being assigned to one of the data distribution servers. Here, the service was broken down by subscriber with the first 250,000 subscribers in a job assigned to data distribution server 1, the second 250,000 into a job for data distribution 2 and so on. Within each data distribution server, a server control system 66 may be provided which controls the processing of all of the subscribers within the job that it has been assigned. In this embodiment, the server control system 66 (also called a runner) has determined to break the job further down into five separate batches; where each batch has been assigned to a separate instance of a message generator system 66 (or generator) to be processed. Here, 50,000 of the subscribers are placed in each batch, with each of the five batches being passed to one of five message generator systems 68 for processing. The message operator systems 68 process each subscriber for that service and pass the created report to a message mail formatting system 70 (or mailer) which in turn supplies the formatted message to the mail server system 72 (or SMTP server) to be sent to end users. The SMTP server then passes the information to each of the subscribers for whom the messages were generated.

Figure 9:
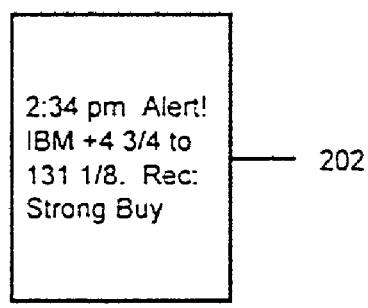
FIG. 9 depicts an example of an output for a mobile phone according to an embodiment of the present invention.

Output from this system may be provided to a plurality of different devices. FIG. 9 depicts an example of an output 202 that may be provided to a mobile phone system that has limited screen space. This message: "2:34 pm alert IBM+4 ¾ to 131⅛: rec. strong buy" might be a response generated by the system from a stock monitoring channel. In this system, a particular stock has gone up several points and an analysis has recommended a strong buy. The user may then act on that information responsively because the information has been automatically generated without the user having to call in and periodically check the status of a particular stock.

Figure 10:
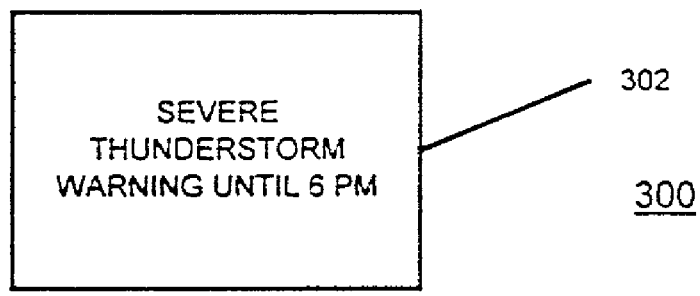
FIG. 10 comprises an example of an output for a pager system according to an embodiment of the present invention.
Figure 11:
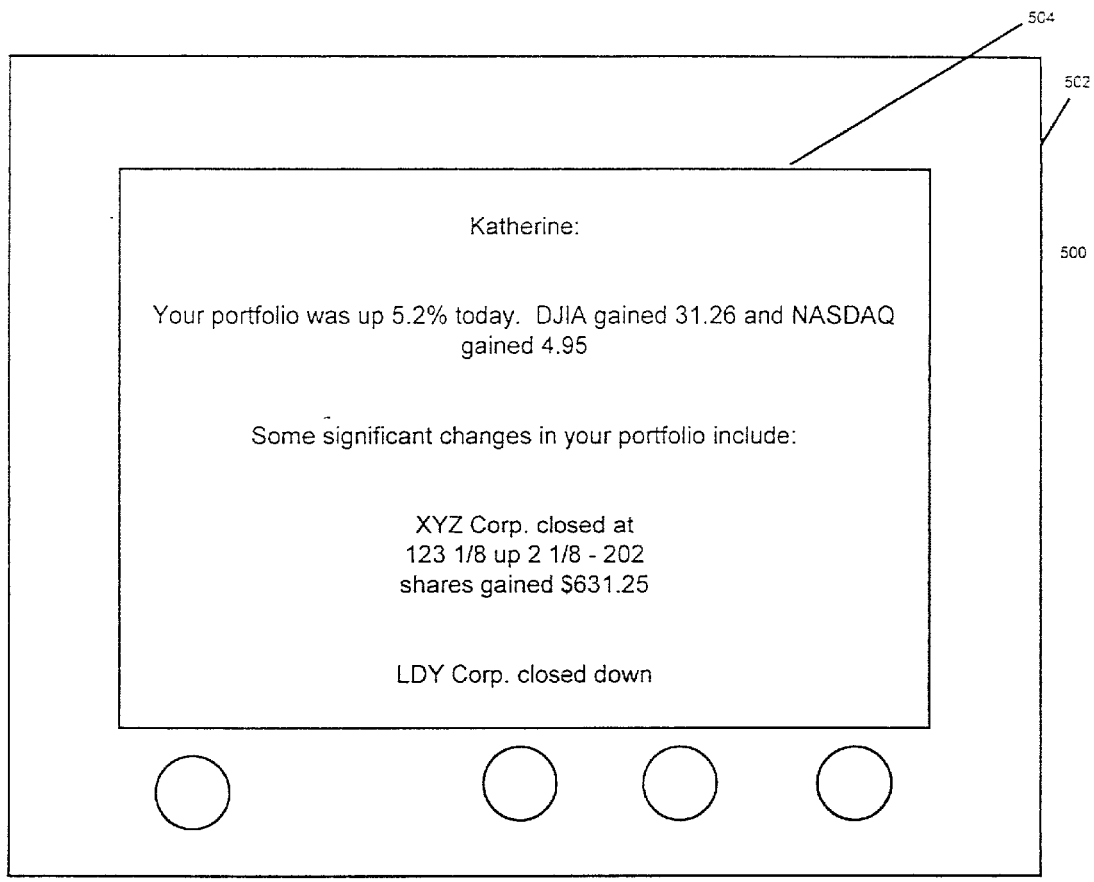
FIG. 11 depicts an embodiment of an output for a personal digital assistant according to an embodiment of the present invention.
Figure 13:
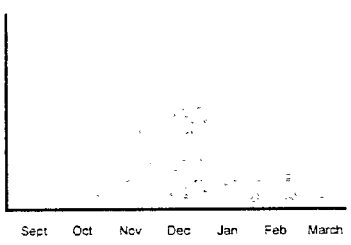
FIG. 13 depicts an example of a facsimile output according to an embodiment of the present invention.
Figure 13:
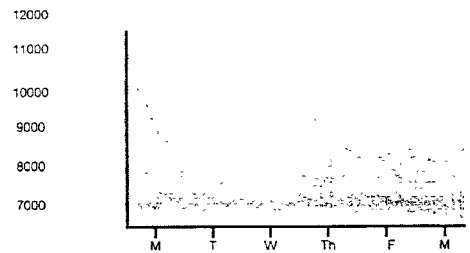
Figure 14:
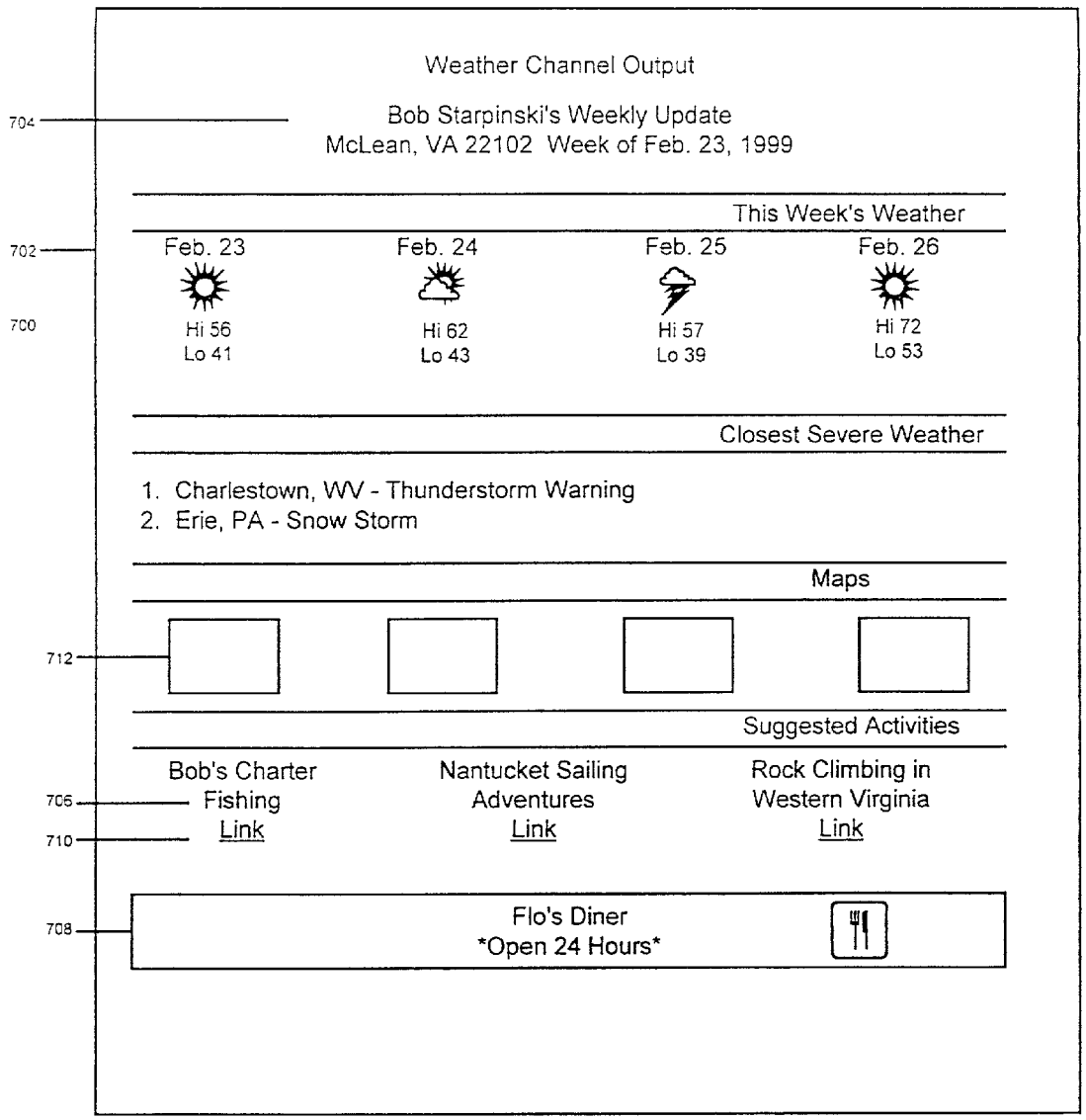
FIG. 14 depicts an example of an HTML output according to an embodiment of the present invention.

FIG. 10 depicts an embodiment 300 of a screen 302 that may be generated for a pager system. In this embodiment, the output message: "Severe thunderstorm warning until 6 p.m." may be the result of a service relating to weather broadcasts. The information may be personalized for a user for a particular weather area such as a particular region where a game or other outdoor event may be scheduled by the user. FIG. 11 depicts an embodiment of an output 500 for a personal digital assistant 502 including an output screen 504 that contains more detailed information that a pager or mobile telephone due to the increased size of the screen. This example depicts the output for an update for stock market information based on a particular user's portfolio. FIG. 12 depicts an embodiment of an output 400 that may be generated for telephone via a voice output system. Output 400 may be read via a text to voice system to the user and may provide information about a particular stock quote for example. FIG. 13 depicts an output that may be generated via facsimile to a user. Embodiment 600 may comprise an output facsimile 602 that may comprise detailed chart and data information that might not otherwise be useable to a user via phone, pager or even personal digital assistant because of the amount of data that would be required to be presented for it to be useful. FIG. 14 depicts an output that may be generated via HTML mail. Because of the graphical capabilities of HTML, the output may create more graphics such as the suns, clouds and other images depicted in embodiment 700. Specifically, this output example is for a weather channel output for a particular user. The weather channel output may comprise a weather forecast section 702, a name section 704, recommended activities 706, with click-and-buy links 710, and additional 708.

Figure 15:
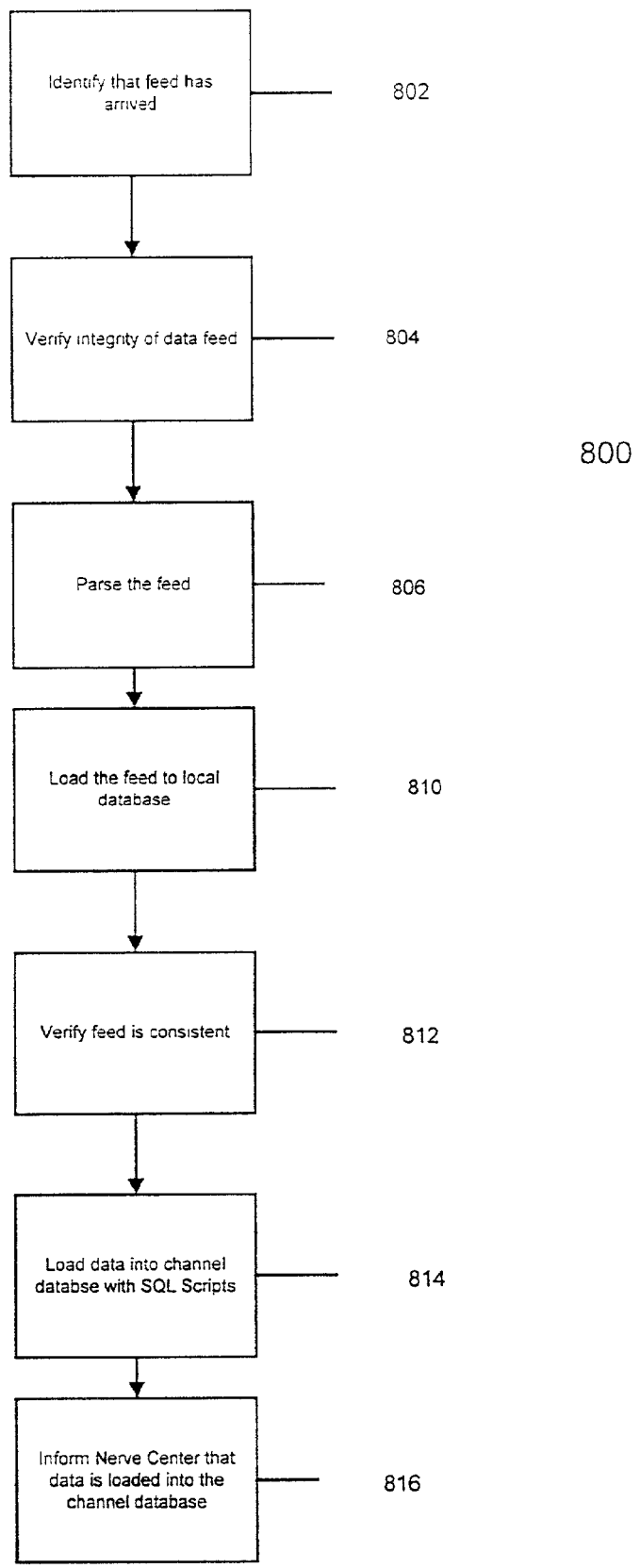
FIG. 15 depicts a method of processing data feeds according to an embodiment of the present invention.

FIG. 15 depicts a method 800 according to the present invention of loading information into the data load system and subsequently into the channel databases. Specifically, method 800 may comprise the step (802) of identifying that a feed has arrived from one of the various sources. Once a feed has arrived, in step 804, the system verifies the integrity of that data feed. Next, in step 806, the system parses the feed and in step 810, loads the feed into a local database at the data feed system. In step 812, the system verifies that the feed is consistent with the database. Then in step 814, the data is loaded into the appropriate channel database such as through the use of SQL with scripts. That process may be performed by transferring data from the data load system to the channel database over the network. Finally, in step 816, the data load system informs the nerve center that data has been loaded into the channel database so that the nerve center knows that updated information is now available to determine whether or not any services need to be processed based on the input of new data.

Figure 16:
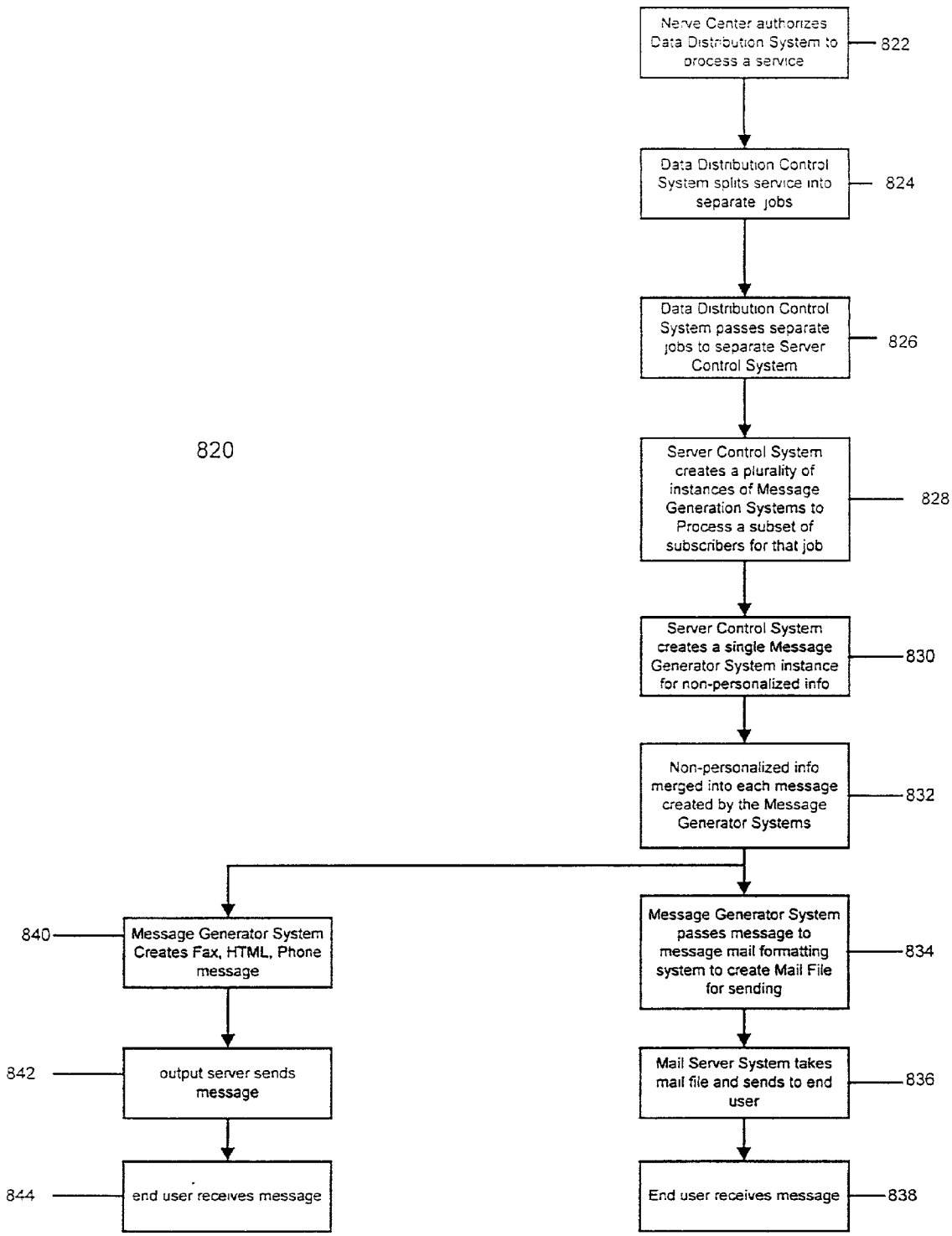
FIG. 16 depicts a method for processing services according to an embodiment of the present invention.

FIG. 16 depicts a method 820 of processing services according to an embodiment of the present invention. Specifically, in step 822, the nerve center authorizes a data distribution system to process a service. Nerve center 44 may do so based on predetermined conditions such as a schedule specified by subscribers to the service or the loading of data related to the service into a channel database. In step 824, the data distribution control system splits the service into a plurality of jobs. In step 826, each of the jobs is assigned to a data distribution server 62. In step 828, each server control system then creates a plurality of instances of message generation systems to process a subset of subscribers for that particular job. In one embodiment, the server control system may also create a single message generator system instance for the non-personalized information in step 830. This may be called mid-tier slicing (also called subsetting, mid-tier processing or page-by processing).

Essentially, mid-tier slicing involves running a single SQL query to retrieve data for multiple subscribers rather than pulling back multiple SQL queries for multiple subscribers. Basically, mid-tier slicing takes a report and slices it into separate portions and processes each portion separately. So if a report has four recipient elements, the report is sliced into four sub-reports and each sub-report is sent to one recipient. Also, for example, that step may be provided to expedite processing by processing the non-personalized information that is common to all subscribers separately as a single SQL query rather than having to reprocess that several hundred thousand times for a the 100,000 subscribers. Slicing may be done based on the subscriber or in an alert case, may be done by trigger condition and then a single report may be generated to a plurality of subscribers that set that trigger condition.

Next, in step 832, the non-personalized information is merged into each message created by the message generator system. At this point, depending on the service output type requested by the subscriber, either steps 840, 842 and 844 are performed or steps 834, 836 and 838 are performed. Specifically, if the user desires an e-mail output, then in step 834, the message generator system passes the message created to the message mail formatting system 72 to create a mail file for sending. Next, in step 836, the mail server system 74 takes the mail file and sends that to the end user. Finally, in step 838, the end user receives the message. If, however, rather than an e-mail message the user desires another type of output, then in step 840, a message generator system creates the fax, HTML, phone message, or other type of output message. Then, in step 842, the output server sends the message, and in step 844, the end user receives the message.

Figure 17:
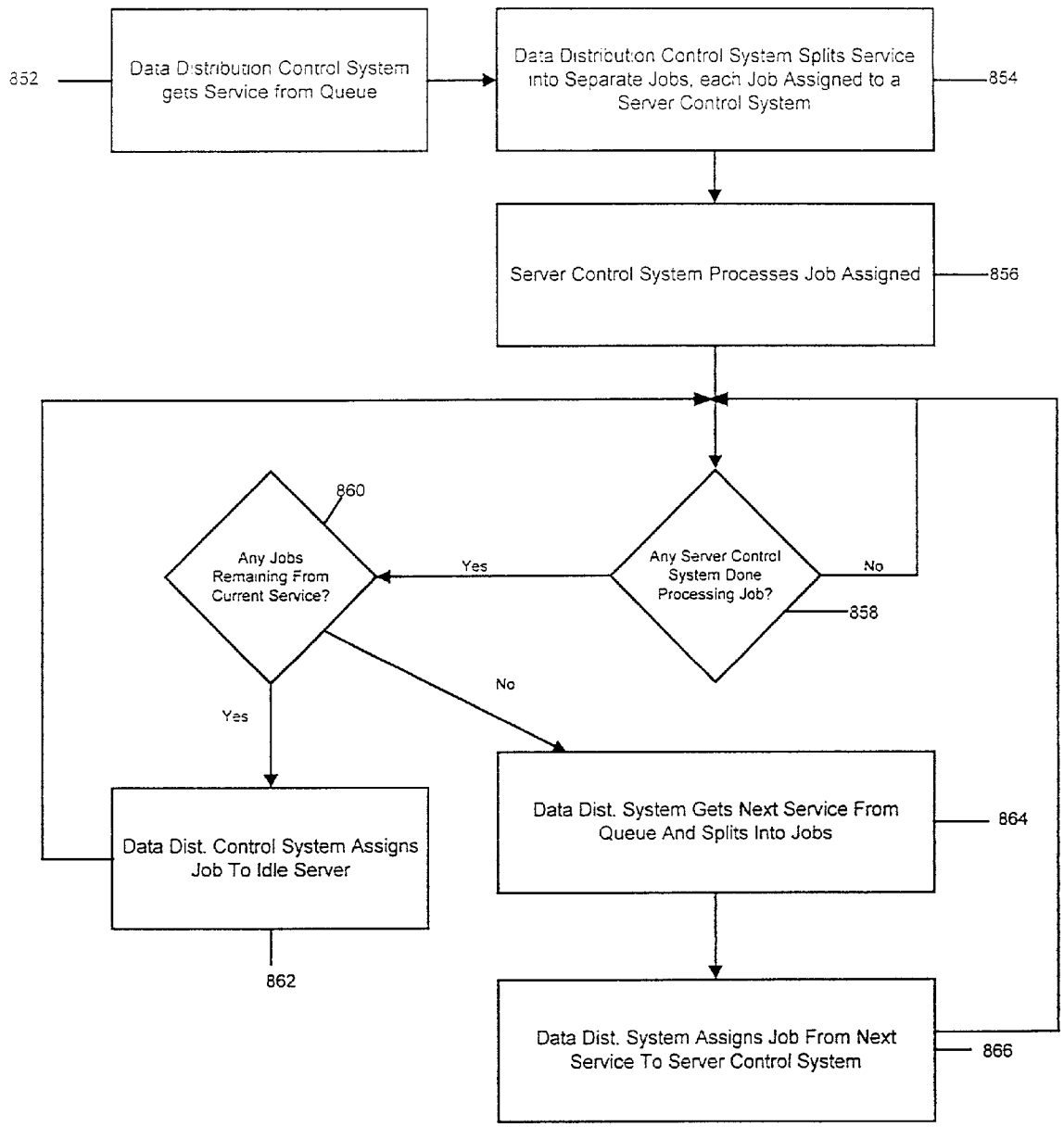
FIG. 17 depicts a method of processing services with multiple jobs according to an embodiment of the present invention.

FIG. 17 depicts a method 850 for monitoring the progress of jobs and continually scheduled additional jobs according to an embodiment of the present invention. Specifically, in step 852, the data distribution control system gets its service from the queue. Next, in step 854, data distribution control system 60 splits the service into separate jobs, with each job being assigned to a server control system 66. Next, in step 856, the server control system processes the job assigned. At that point, the system passes control to a decision block 858. At decision block 858, the system determines whether any server control system is done processing the job. If not, then the system continues to monitor until a server control system has processed the job. When a server control system finishes processing a job, then control passes to decision block 860. In step 860, it is determined whether there are any jobs remaining from the service that is being presently processed by the data distribution control system. If there are any jobs remaining, then the data distribution control system assigns another job to the idle server control system in step 862 and control passes back then to step 854 to continue monitoring for completed server control systems. If in step 860, it is determined that there are no remaining jobs, rather than waiting for all of the jobs of a particular service to be completed before starting the process another service, the data distribution control system 60 is instructed by nerve center 44 to begin processing the next service from the queue and splitting that service into jobs to be processed in step 864. In step 866, the data distribution control system assigns a job from the next service to a server control system and then control passes back up to 858. All of this process continues until there are no more jobs and no more services in the queue to be processed.

It may also be desired to provide a system that enables administrators and other users to create services. A developer application may be provided that enables creation of a service through use of templates such as the FrontPage, HomeSite and NetObjects Fusion products that enable creation of choices that may be run. Also, the developer would have to select the reports to be generated for the service. Those reports may be reports already created using MicroStrategy's Agent product, or some other system.

Also, a GIF generator system may be provided to generate charts, graphs and other output for inclusion in HTML mail and Excel™ spreadsheet outputs.

Throughout the system a number of databases are described. In an embodiment, Microsoft SQL Server 7.0 may be used as the data server technology and Microsoft Data Replication as the data replication technology. Transactions that require transactional consistence are sent using the Microsoft Transaction Server (MTS) product.

As described herein, a number of hardware and software components have been described. In an embodiment, the following hardware and software may be used: Dell PowerEdge 6350 Servers, Dell PowerVault 200S Disk Arrays, RAID, and Redundant Network Inter-face Cards. Also the following software components may be implemented in this system: Microsoft Windows NT 4.0 Enterprise Edition Operating System, Microsoft Clustering Services (MSCS), Microsoft Windows Load Balancing Services (WLBS), Microsoft SQL Server 7.0, NetIQ AppManager—System Monitoring, and HP Openview—Network Monitoring, Microsoft Site Server—Web Log Analysis and Reporting.

MicroStrategy uses standard Dell PowerEdge Server and PowerVault disk array hardware throughout its architecture consisting of Microsoft Clustering Services (MSCS) or Microsoft Windows Load Balancing C, Services (WLBS) clustered systems. The building blocks of these clusters are the Power-Edge 6350 servers C, (quad processor capable, 4 GB RAM capable) and the PowerVault 200S Ultra-2 LVD SCSI Disk Array. To achieve RAID disk subsystem reliability the Dell PowerEdge Expandable RAID Controller 2 (PERC2) may be provided within each system.

Systems described in the present invention may be clustered using either tightly coupled Microsoft NT clustering or loosely coupled using Microsoft's Web Load Balancing Software (WLBS) or using MicroStrategy's Cheetah clustering technology. Machines may also have RAID hard disk arrays for fault tolerance.

Each of the server systems depicted in the present invention may comprise Microsoft SQL servers which are multithreaded server engine product that runs on top of Windows NT 4.0. The physical hardware the server is running on is the first area of scalability. Servers with dual processor chips and 512 megabytes of memory may be used, although the systems may use two additional CPUs and an additional 1.5 gigabytes of memory to boost performance.

It should be understood that other hardware and software implementations may also be provided within the spirit of the invention. Other embodiments and uses of the invention will be apparent to those skilled in the art from consideration of the specification and practice of the invention disclosed herein. The specification and examples should be considered exemplary only.

What is claimed is:

1. A system for delivering personalized informational content to subscribers comprising:
a personalized intelligence computer network system comprising:
subscription means for enabling users to subscribe to one or more services on one or more channel databases;
personalization means for enabling users to indicate personalization options relating to the one or more services;
one or more channel databases containing informational data about a subject matter of interest for a plurality of subscribers;
service processing means for processing at least one service for a plurality of subscribers using the information from one of the channel databases;
output forwarding means for automatically forwarding output from the services to one or more subscriber output devices specified for that service; and
revenue collecting means that collects revenue as a result of the output of services to subscribers.

2. The system of claim 1 wherein the revenue collecting means comprising a subscription transaction processing means that charges subscribers fees.

3. The system of claim 2 wherein the fee charged to the subscriber is a periodic charge.

4. The system of claim 2 wherein the fee charged to the subscriber is based on the services to which the subscriber subscribes.

5. The system of claim 2 wherein the fee charged is based on the usage by the subscriber of personalized intelligence network system.

6. The system of claim 1 wherein the revenue collecting means comprises advertising collection means for collecting fees for advertisements included in the service outputs.

7. The system of claim 1 wherein the revenue collecting means comprises transactional means that performs transactions with subscribers resulting from service output and allocates revenues from the transactions to the personalized intelligence network system and one or more affiliate systems.

8. The system of claim 1 wherein the revenue collecting means comprises bundling fee generating means for generating bundling fees for bundling service subscriptions with another product or service and allocating revenues from the bundling to the personalized intelligence network system.

9. The system of claim 1 further comprising one or more affiliate systems that inform users about subscribing to one or more services from the personalized intelligence network.

10. The system of claim 9 wherein at least one of the affiliate systems comprises an accessible network site that provides content to its users and wherein the accessible network enables user to connect to the subscription means.

11. The system of claim 10 wherein the accessible network site provides an executable link to a network-based subscription interface system that enables the user to subscribe to one or more services.

12. The system of claim 11 wherein the accessible network site comprises a web site.

13. The system of claim 9 wherein the affiliate system and personal intelligence network share revenues generated from subscriptions.

14. The system of claim 13 wherein the shared revenues are based on the revenues generated by the subscribers that subscribe as a result of the affiliate system.

15. The system of claim 9 wherein subscribers are charged a fee and wherein the revenue from the fees charged to subscribers is shared between the affiliate system and the personal intelligence network system.

16. The system of claim 9 wherein the revenue collecting means attributes a revenue value to advertisements included in the service outputs.

17. The system of claim 16 wherein the revenue shared between the affiliate system and the personalized intelligence network includes advertising revenue.

18. The system of claim 9 wherein the revenue collecting means collects an advertising revenue from the affiliate system.

19. The system of claim 9 wherein the revenue collecting means collects an advertising revenue from a third party entity.

20. The system of claim 9 wherein the revenue collecting means comprises transactional means that performs transactions with subscribers resulting from the service output and allocates revenues from the transactions to the personalized intelligence network system.

21. The system of claim 20 wherein the revenue shared between affiliate systems and the personalized intelligence network includes transactional related revenues.

22. The system of claim 9 wherein the affiliate system bundles a service subscription with another product or service for a fee and the revenue collecting means allocates a revenue value for a subscription portion from the bundled fee.

23. The system of claim 22 wherein the revenue shared between affiliate systems and the personalized intelligence network includes bundling fee allocations.

24. The system of claim 9 comprising at least two affiliates and wherein revenue collected is shared between at least two affiliates.

25. The system of claim 9 wherein the affiliate system comprises content provision means for providing content to one or more channel databases.

26. The system of claim 25 wherein the content provided by the affiliate system is provided to an affiliate channel for that affiliate system.

27. The system of claim 9 wherein the affiliate system comprises content filtering means for specifying filters to be applied to service output prior to sending service output to subscribers from that affiliate system.

\* \* \* \* \*